United States Patent [19]

Vidwans et al.

[11] Patent Number: 5,740,393
[45] Date of Patent: Apr. 14, 1998

[54] INSTRUCTION POINTER LIMITS IN PROCESSOR THAT PERFORMS SPECULATIVE OUT-OF-ORDER INSTRUCTION EXECUTION

[75] Inventors: Rohit A. Vidwans, Beaverton; Darrell D. Boggs, Aloha; Michael A. Fetterman; Andrew F. Glew, both of Hillsboro, all of Oreg.

[73] Assignee: Intel Corporation, Santa Clara, Calif.

[21] Appl. No.: 723,286

[22] Filed: Sep. 30, 1996

Related U.S. Application Data

[63] Continuation of Ser. No. 138,470, Oct. 15, 1993, abandoned.

[51] Int. Cl.$^6$ .................. G06F 9/38; G06F 9/30
[52] U.S. Cl. .................. 395/391; 395/800; 395/586
[58] Field of Search ................. 395/275, 376, 395/800, 391, 584, 586

[56] References Cited

U.S. PATENT DOCUMENTS

| | | | |
|---|---|---|---|
| 4,858,105 | 8/1989 | Kuriyama et al. | 395/375 |
| 5,067,069 | 11/1991 | Fite et al. | 395/375 |
| 5,129,067 | 7/1992 | Johnson | 395/375 |
| 5,136,697 | 8/1992 | Johnson | 395/375 |
| 5,155,817 | 10/1992 | Kishigami et al. | 395/375 |
| 5,204,953 | 4/1993 | Dixit | 395/421.1 |
| 5,303,356 | 4/1994 | Vassiliadis et al. | 395/375 |
| 5,345,569 | 9/1994 | Tran | 395/375 |
| 5,355,457 | 10/1994 | Shebanow et al. | 395/375 |
| 5,367,650 | 11/1994 | Sharangpani et al. | 395/375 |
| 5,421,020 | 5/1995 | Levitan | 395/800 |
| 5,434,987 | 7/1995 | Abramson et al. | 395/375 |
| 5,450,560 | 9/1995 | Bridges et al. | 395/410 |

OTHER PUBLICATIONS

"Superscalar Microprocessor Design", Mike Johnson; Prentice Hall 1991; pp. 87 and 89.
V. Popescu, et al., "The Metaflow Architecture", IEEE Micro, 1991, pp. 10–13, and 63–73.
Mike Johnson, "Superscalar Microprocessor Design", Prentice Hall, 1991.

*Primary Examiner*—Jack B. Harvey
*Assistant Examiner*—Paul R. Myers
*Attorney, Agent, or Firm*—Blakely, Sokoloff, Taylor & Zafman

[57] ABSTRACT

A method for enforcing an instruction pointer limit in a processor, wherein a retire circuit determines a speculative instruction pointer for a set of retiring instruction during a retirement operation. The retire circuit also determines whether each speculative instruction pointer exceeds the instruction pointer limit. The retire circuit commits the result data value of each instruction to the architectural state if the speculative instruction pointer for the result data value does not exceed the instruction pointer limit.

53 Claims, 9 Drawing Sheets

INSTRUCTION POINTER LIMITS IN PROCESSOR THAT PERFORMS SPECULATIVE OUT-OF-ORDER INSTRUCTION EXECUTION

This is a continuation of application Ser. No. 08/138,470, filed Oct. 15, 1993, now abandoned.

BACKGROUND OF THE INVENTION

FIELD OF THE INVENTION

The present invention pertains to the field of computer systems. More particularly, this invention relates to detecting and enforcing instruction pointer limits in a processor employing speculative out of order instruction execution.

BACKGROUND

Typical prior computer processors implement in-order instruction execution pipelines. An in-order processor usually fetches an instruction stream from a memory, and executes each instruction in the instruction stream according to a program order. Typically, such an in-order processor determines the program order as the instructions are executed, and continuously updates an instruction pointer that specifies a next instruction in the instruction stream.

Some prior processors implement a mechanism for limiting the valid range of the instruction pointer. Such an instruction pointer limitation is commonly implemented in conjunction with a mechanism for providing a relocatable base address for the instruction stream. Such processors provide a base to bounds memory management protection mechanism that prevents erroneous program execution across program modules.

For example, one prior processor provides a code segment base register that defines a base address for the instruction stream, and a instruction pointer limit register that defines the valid range of the instruction pointer from the base address.

An in-order processor usually enforces such an instruction pointer limit by determining an updated instruction pointer as each instruction is executed, and by determining whether the updated instruction pointer exceeds the instruction pointer limit. If the updated instruction pointer exceeds the instruction pointer limit, the processor typically performs a predefined operation to indicate an instruction pointer limit violation.

An instruction stream typically contains certain instructions that cause discontinuities in the program order. For example, jump instructions, call instructions, and return instructions may cause the processor to redirect the instruction pointer to a discontinuous location in the memory defined by a target address. Such instructions that cause discontinuities in the program order are hereinafter referred to as branch instructions.

A branch instruction may be a conditional branch instruction or an unconditional branch instruction. A conditional branch instruction may or may not cause a discontinuity in the program order. The processor typically tests the execution results of prior instructions to determine whether a conditional branch is taken. In addition, the processor may require the execution results of prior instructions to determine a target address for a conditional or an unconditional branch instruction.

A processor must resolve such discontinuities before updating the instruction pointer and enforcing an instruction pointer limit. In-order instruction execution ensures that such discontinuities are resolved prior to enforcement of the instruction pointer limit. Such in-order instruction execution also ensures that execution results of prior instructions are available to determine a target address of a branch and properly update the instruction pointer.

A processor may implement an out of order instruction execution pipeline to increase instruction execution performance. Such a processor executes ready instructions in the instruction stream ahead of earlier instructions that are not ready. A ready instruction is typically an instruction having fully assembled source data.

Such out of order execution improves processor performance because the instruction execution pipeline of the processor does not stall while assembling source data for a non ready instruction. For example, a non ready instruction awaiting source data from an external memory fetch does not stall the execution of later instructions in the instruction stream that are ready to execute.

Some out of order processors may fetch an instruction stream from a memory, and convert each instruction of the incoming stream into a set of micro instructions according to the sequential program order. Such an out of order processor then executes the micro instructions according to the availability of source data and execution resources rather than the program order.

A processor may also implement a speculative instruction execution pipeline to increase instruction execution performance. A processor employing speculative instruction execution typically determines a speculative execution path through a program by predicting the outcome of conditional branch instructions. Such a processor fetches an instruction stream from a memory, predicts whether conditional branch instructions in the instruction stream will result in a branch, and continues fetching and executing the instruction stream according to the perdiction. Such speculative execution increases processor performance because the instruction execution pipeline does not stall during the resolution of conditional branch instructions.

Enforcement of an instruction pointer limit in a processor that implements a speculative out of order instruction execution pipeline creates several complications because such a processor generates out of order speculative result data for each micro instruction. The result data is out of order because the micro instructions that cause generation of the result data are executed out of order. The result data is speculative until the branch prediction that caused speculative execution of the corresponding micro instruction is resolved. The result data for a micro instruction is also speculative until program exceptions for the corresponding instruction are resolved.

In such a processor, prior discontinuities in the instruction stream may not be resolved when an instruction executes. In addition, the execution results of prior instructions that are required to determine a target address or condition of a branch instruction may not be available when the branch instruction executes. As a consequence, such a processor cannot properly update the instruction pointer and perform an instruction pointer limit check as such instructions are executed.

SUMMARY AND OBJECTS OF THE INVENTION

One object of the present invention is to enforce an instruction pointer limit in a processor that performs speculative instruction execution.

Another object of the present invention is to enforce an instruction pointer limit in a processor that performs out-of-order instruction execution.

A further object of the present invention is to enforce an instruction pointer limit in a processor that performs speculative out-of-order instruction execution.

Another object of the present invention is to enforce an instruction pointer limit in a processor that performs speculative out-of-order instruction execution and that commits multiple instructions to an architectural state during each clock cycle.

Another object of the present invention is to enforce an instruction pointer limit in a processor that performs speculative out-of-order instruction execution, wherein multiple sequential result data values can be committed to an architectural state during each clock cycle.

Another object of the present invention is to enforce an instruction pointer limit in a processor that performs speculative out-of-order instruction execution, wherein one or more target addresses can be committed to an architectural state during each clock cycle.

These and other objects of the invention are provided by a method for enforcing an instruction pointer limit in a processor. During a retirement operation, a retire circuit reads a set of reorder buffer entries from a reorder circuit. Each reorder buffer entry stores a result data value from a speculative execution of an instruction. The reorder buffer entries are arranged in a sequential program order of the instructions.

The retire circuit determines a speculative instruction pointer for each instruction. The speculative instruction pointer indicates an updated instruction pointer for the processor if the corresponding result data value is committed to an architectural state. The retire circuit also determines whether each speculative instruction pointer exceeds the instruction pointer limit.

The retire circuit commits the result data value of each reorder buffer entry to the architectural state if the speculative instruction pointer for the result data value does not exceed the instruction pointer limit.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
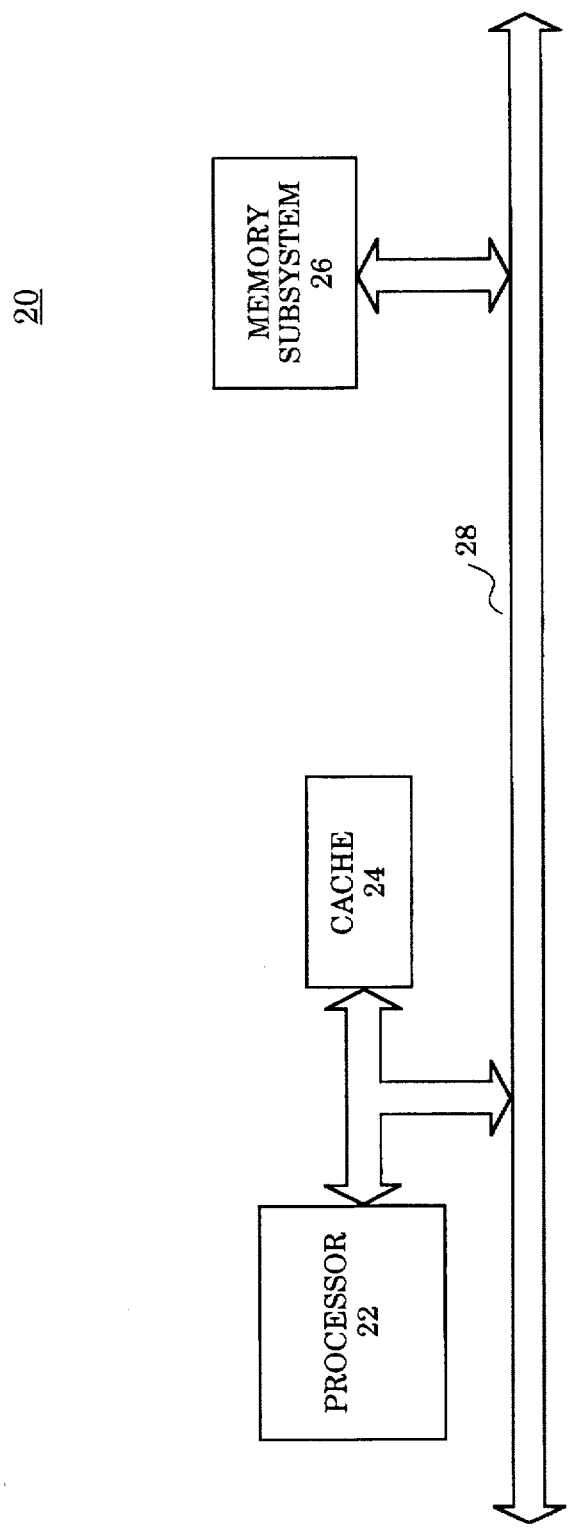
FIG. 1 illustrates a computer system comprising a processor, a cache, and a memory subsystem.

FIG. 1 illustrates a computer system 20. The computer system 20 comprises a processor 22, a cache circuit 24, and a memory subsystem 26. The processor 22, the cache circuit 24 and the memory subsystem 26 communicate over a host bus 28.

The processor 22 fetches a stream of macro instructions from the memory subsystem 26 over the host bus 28 through the cache circuit 24. The processor 22 executes the stream of macro instructions and maintains data storage in the memory subsystem 26.

The cache circuit 24 is an instruction cache for macro instructions executed by the processor 22. The cache circuit 24 is also a data cache for the processor 22.

Figure 2:
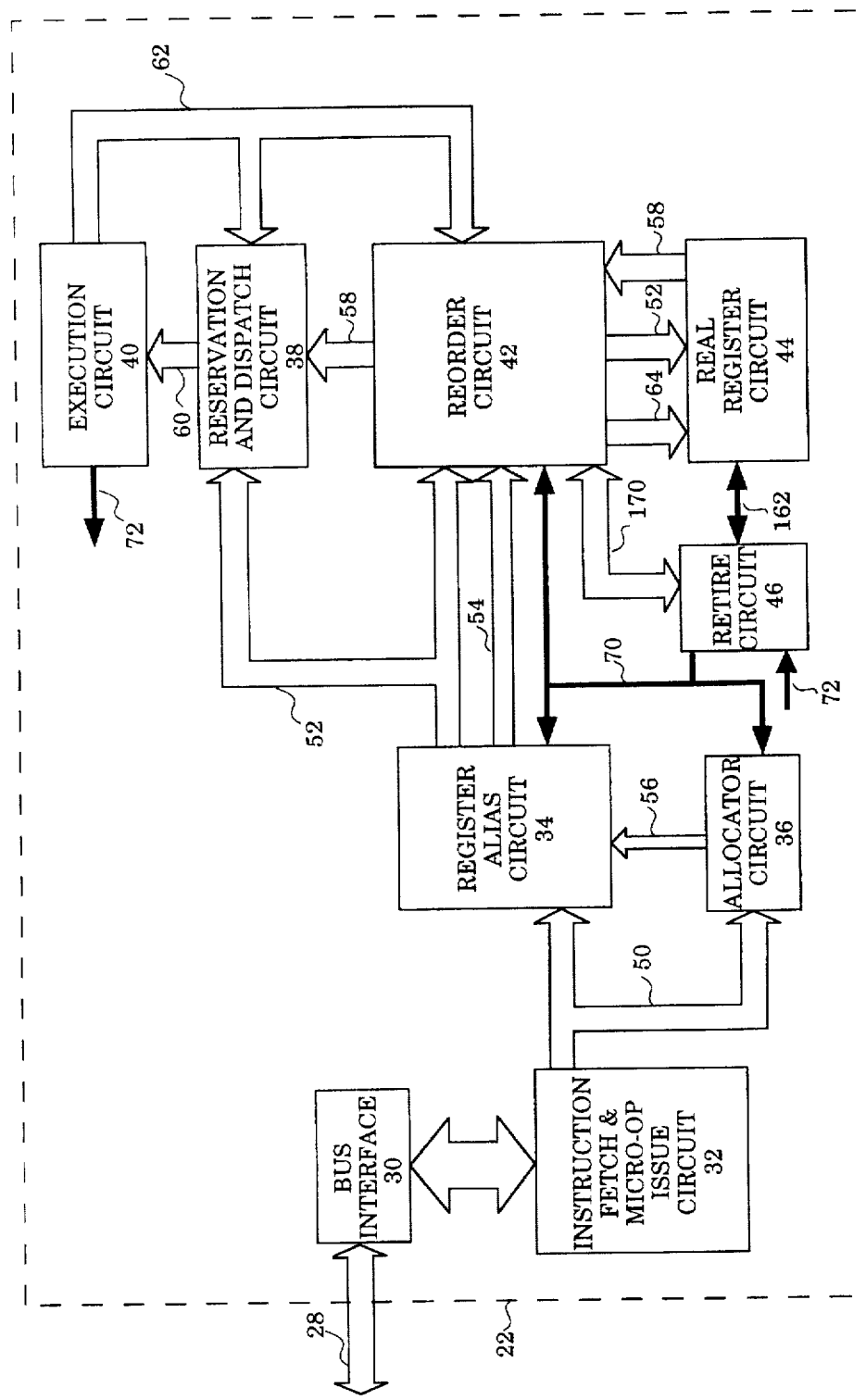
FIG. 2 is a block diagram of a processor for one embodiment.

FIG. 2 illustrates the processor 22. The processor 22 comprises a bus interface circuit 30 and an instruction fetch and micro-op issue circuit 32, a register alias circuit 34, and an allocator circuit 36. The processor 22 also comprises a reservation and dispatch circuit 38, an execution circuit 40, a reorder circuit 42, a real register circuit 44, and a retire circuit 46.

The bus interface circuit 30 enables transfer of address, data and control information over the multiprocessor bus 28. The instruction fetch and micro-op issue circuit 32 fetches a stream of macro instructions from the memory subsystem 26 over the multiprocessor bus 28 through the bus interface circuit 30. The instruction fetch and micro-op issue circuit 32 implements speculative branch prediction to maximize macro-instruction fetch throughput.

For one embodiment the stream of macro instructions fetched over the multiprocessor bus 28 comprises a stream of Intel Architecture Microprocessor macro instructions. The Intel Architecture Microprocessor macro instructions operate on a set of architectural registers, including an EAX register, an EBX register, an ECX register, and an EDX register, etc., as well as floating-point registers.

The instruction fetch and micro-op issue circuit 32 converts the macro-instruction of the incoming stream of macro instructions into an in-order stream of logical micro operations, hereinafter referred to as logical micro-ops. The instruction fetch and micro-op issue circuit 32 generates one or more logical micro ops for each incoming macro instruction. The logical micro-ops corresponding to each macro instruction are reduced instruction set micro operations that perform the function of the corresponding macro instruction. The logical micro-op specify arithmetic: and logical operations as well as load and store operations to the memory subsystem 26.

The instruction fetch and micro-op issue circuit 32 transfers the in-order stream of logical micro-ops and corresponding macro instruction pointer delta values and flow markers to the register alias circuit 34 and the allocator circuit 36 over a logical micro-op bus 50. For one embodiment, the instruction fetch and micro-op issue circuit 32 issues up to four in-order logical micro-ops during each clock cycle of the processor 22. Alternatively, the instruction fetch and micro-op issue circuit 32 .issues up to three in-order logical micro-ops during each clock cycle of the processor 22 in order to reduce the integrated circuit die space for implementing the processor 22.

Each logical micro-op on the logical micro-op bus 50 comprises an op code, a pair of logical sources and a logical destination, a macro instruction pointer delta value, and a set of flow markers. Each logical source may specify a register or provide an immediate data value. The register logical sources and the logical destinations of the logical micro-ops specify architectural registers of the original macro instructions.

The instruction fetch and micro-op issue circuit 32 generates the macro instruction pointer delta value for a logical micro-op to indicates the length in bytes of the corresponding macro instruction. For example, each logical micro-op of a four byte macro instruction has a macro instruction pointer delta value equal to four.

The instruction fetch and micro-op issue circuit 32 generates the flow markers to indicate the boundaries of macro instructions. The flow markers include a beginning of macro instruction (BOM) flow marker, and an end of macro instruction (EOM) flow marker. The BOM flow marker indicates that the corresponding logical micro-op is the first logical micro-op of a macro instruction, and the EOM marker indicates that the. corresponding logical micro-op is the last logical micro-op of the macro instruction. If a macro instruction maps to only one logical micro-op, then that logical micro-op carries both the BOM and the EOM flow markers.

The register alias circuit 34 receives the in-order logical micro-ops over the logical micro-op bus 50, and generates a corresponding set of in-order physical micro-ops by renaming the logical sources and logical destinations of the logical micro-ops. The register alias circuit 34 receives the in-order logical micro-ops over the logical micro-op bus 50, maps the register logical sources and the register logical destination of each logical micro-op into physical sources and a physical destination, and transfers the in-order physical micro-ops, along with corresponding macro instruction pointer delta values and flow markers over a physical micro-op bus 52.

Each physical micro-op comprises the opcode of the corresponding logical micro-op, a pair of physical sources, and a physical destination. Each physical source may specify a physical register or provide an immediate data value. The register physical sources of the physical micro-ops specify physical registers contained in the reorder circuit 42 and committed state registers contained in the real register circuit 44. The physical destinations of the physical micro-ops specify physical registers contained in the reorder circuit 42.

The register alias circuit 34 transfers the logical destinations, macro instruction pointer delta values, and flow markers of the logical micro-ops over a logical destination bus 54. The logical destinations on the logical destination bus 54 identify the architectural registers that correspond to the physical destinations on the physical micro-op bus 52.

The allocator circuit 36 tracks the available resources in the reorder circuit 42, the reservation and dispatch circuit 38, and the execution circuit 40. The allocator circuit 36 assigns physical destinations in the reorder circuit 42 and reservation station entries in the reservation and dispatch circuit 38 to the physical micro-ops on the physical micro-op bus 52.

The allocator circuit 36 transfers the assigned physical destinations to the register alias circuit 34 over a physical destination bus 56. The allocated physical destinations specify physical registers in the reorder circuit 42 for buffering speculative results for the physical micro-ops. The allocated physical destinations are used by the register alias circuit 34 to rename the logical destinations of the logical micro-ops to physical destinations.

The allocator circuit 36 assigns the physical registers of the reorder circuit 42 to the physical micro-ops in the same order that logical micro-ops are received over the logical micro-op bus 50. The allocator circuit 36 maintains an allocation pointer for allocating physical registers of the reorder circuit 42. The ordering of the physical registers assigned to the physical micro-ops in the reorder circuit 42 reflects the ordering of the original logical micro-ops.

The reservation and dispatch circuit 38 buffers the physical micro-ops awaiting execution by the execution circuit 40. The reservation and dispatch circuit 38 receives the physical micro-ops over the physical micro-op bus 50 and stores the physical micro-ops in available reservation station entries. The reservation and dispatch circuit 38 assembles source data for the physical micro-ops, and dispatches the physical micro-ops to appropriate execution units in the execution circuit 40 when the source data is assembled.

The reorder circuit 42 contains the physical registers that buffer speculative results for the physical micro-ops. The physical registers of the reorder circuit 42 buffer integer and floating-point speculative result data.

The real register circuit 44 contains committed state registers that correspond to the architectural registers of the original stream of macro-instructions. The real register circuit 44 also contains a committed state register for the instruction pointer of the processor 22.

For one embodiment, the committed state registers of the real register circuit 44 comprise the EAX, EBX, ECX, and EDX registers, etc. and architectural flags, as well as the EIP instruction pointer register of the Intel Architecture Microprocessor.

The reorder circuit 42 and the real register circuit 44 receive the physical micro-ops over the physical micro-op bus 52. The physical sources of the physical micro-ops specify physical registers in the reorder circuit 42 and committed state registers in the real register file 44 that hold the source data for the physical micro-ops.

The reorder circuit 42 and the real register circuit 44 read the source data specified by the physical sources, and transfer the source data to the reservation and dispatch circuit 38 over a source data bus 58. Each physical source on the physical micro-op bus 52 includes a real register file valid (rrfv) flag that indicates whether the corresponding source data is contained in a physical register in the reorder circuit 42 or a committed state register in the real register file 44.

The physical destinations of the physical micro-ops on the physical micro-op bus 52 specify physical registers in the reorder circuit 42 for buffering the speculative results of the out of order execution of the physical micro-ops. The reorder circuit 42 receives the physical destinations of the physical micro-ops over the physical micro-op bus 52, and clears the physical registers specified by the physical destinations.

The reorder circuit 42 receives the logical destinations and flow markers corresponding to the physical micro-ops over the logical destination bus 54, and stores the logical destinations and flow markers into the physical registers specified by the physical destinations of the physical micro-ops.

The reservation and dispatch circuit 38 receives the source data for the pending physical micro-ops from the reorder circuit 42 and the real register circuit 44 over the source data bus 58. The reservation and dispatch circuit 38 also receives source data for the pending physical micro-ops from the execution circuit 40 over a result bus 62 during a write back of speculative results from the execution circuit 40 to the reorder circuit 42.

The reservation and dispatch circuit 38 schedules the physical micro-ops having completely assembled source data for execution. The reservation and dispatch circuit 38 dispatches the ready physical micro-ops to the execution circuit 40 over a micro-op dispatch bus 60. The reservation and dispatch circuit 38 schedules execution of physical micro-ops out of order according to the availability of the source data for the physical micro-ops, and according to the availability of execution unit resources in the execution circuit 40.

The execution circuit 40 writes back the speculative results from the out of order execution of the physical micro-ops to the reorder circuit 42 over the result bus 62. The writes back of speculative results by the execution circuit 40 is out of order due to the out of order dispatching of physical micro-ops by the reservation and dispatch circuit 38 and the differing number of processor 22 cycles required for execution of the differing types of physical micro-ops.

For one embodiment, the execution circuit 40 comprises a set of five execution units, and the reservation and dispatch circuit 38 dispatches up to five physical micro-ops concurrently to the execution circuit 40 over the micro-op dispatch bus 60.

The execution circuit 40 contains an address generation unit that executes physical micro-ops targeted for a code segment base register and a instruction pointer limit register for the processor 22. The execution circuit 40 generates instruction pointer limit values by executing physical micro-ops that load the instruction pointer limit register, and then transfers the instruction pointer limit values to the retire circuit 46 over a control register bus 72.

The retire circuit 46 contains the instruction pointer limit register. The retire circuit 46 receives the instruction pointer limit values over the control register bus 72, and stores the instruction pointer limit values in the instruction pointer limit register.

The speculative results held in the physical registers of the reorder circuit 42 are committed to an architectural state in the same order as the original logical micro-ops were received. During a retirement operation, the reorder circuit 42 transfers the speculative results of the physical registers of the reorder circuit 42 to the corresponding committed state registers of the real register circuit 44 over a retirement bus 64.

The retirement operations are controlled by the retire circuit 46. The retire circuit 46 signals a retirement operation by transferring a retirement pointer over a retire notification bus 70. The retirement pointer specifies a set of physical registers in the reorder circuit 42 for the retirement operation. For one embodiment, the retire circuit 46 retires up to four physical registers during each cycle of the processor 22. For another embodiment that minimizes integrated circuit die space required to implement the processor 22, the retire circuit 46 retires up to three physical registers during each cycle of the processor 22.

The reorder circuit 42 receives the retirement pointer over the retire notification bus 70, and reads the set of physical registers specified by the retirement pointer. The reorder circuit 42 then transfers the speculative result data from the retiring physical destinations to the real register circuit 44 over the retirement bus 64. The reorder circuit 42 also transfers macro instruction pointer delta values, flow markers and result data values from the retiring physical destinations to the retire circuit 46 over a retire control bus 170.

The retire circuit 46 receives macro instruction pointer delta values and flow markers for the retiring physical destinations over the retire control bus 170, and receives a current instruction pointer value from the real register circuit 44 over an instruction pointer bus 162. The retire circuit 46 determines a new instruction pointer value for the retiring physical destinations, and determines whether any of the retiring physical micro-ops cause a instruction pointer limit violation. The retire circuit 46 then writes a new instruction pointer value to the real register circuit 44 over the instruction pointer bus 162, and write fault information into the architectural fault registers of the real register circuit 44 if a instruction pointer limit violation was detected.

The register alias circuit 34 and the allocator circuit 36 receive the retirement pointer over the retire notification bus 70. The register alias circuit 34 accordingly updates the register alias table to reflect the retirement. The allocator circuit 36 marks the retired physical registers in the reorder circuit 42 as available for allocation.

Figure 3:
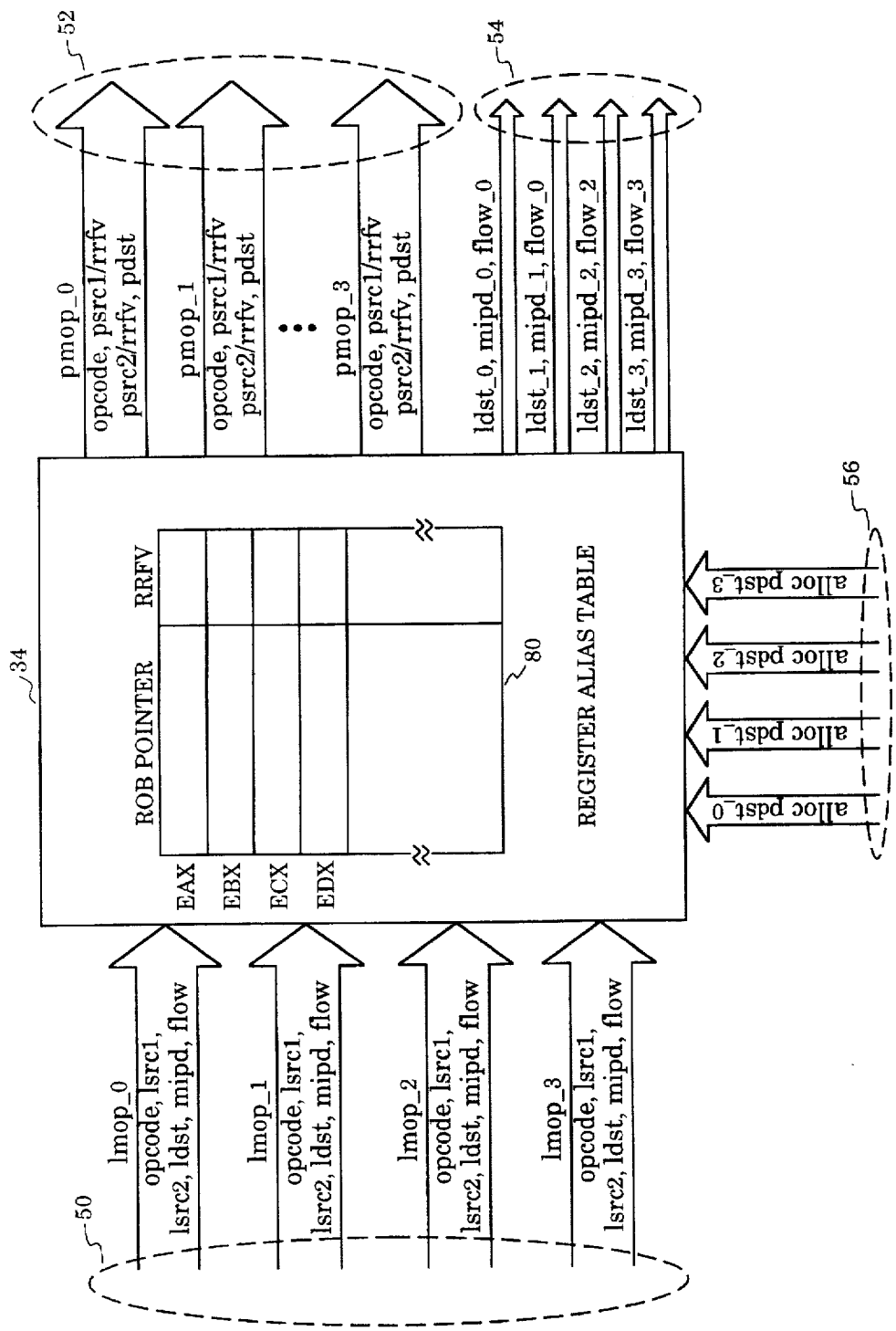
FIG. 3 is a diagram that illustrates the functions of the register alias circuit which implements a register alias table for logical to physical register renaming.

FIG. 3 is a diagram that illustrates the functions of the register alias circuit 34. The register alias circuit 34 implements a register alias table 80. The register alias table 80 enables logical to physical register renaming by mapping the logical sources and destinations to the physical sources and destinations. The physical sources and destinations of the physical micro-ops specify physical registers in the reorder circuit 42 and committed state registers in the real register circuit 44.

The entries in the register alias table 80 correspond to the architectural registers of the original macro instruction stream. For one embodiment, the EAX, EBX, ECX, and EDX entries of the register alias table 80 correspond to the EAX, EBX, ECX, and EDX registers of the Intel Architecture Microprocessor.

Each entry in the register alias table 80 stores a reorder buffer (ROB) pointer. The ROB pointer specifies a physical register in the reorder circuit 42 that holds the speculative result data for the corresponding architectural register. Each entry in the register alias table 80 also stores a real register file valid (rrfv) flag that indicates whether the speculative result data for the corresponding architectural register has been retired to the appropriate committed state register in the real register circuit 44.

The register alias circuit receives the in order logical micro-ops (lmop_0 through lmop_3) over the logical micro-op bus 50. Each logical micro-op comprises an op code, a pair of logical sources (lsrc1 and lsrc2), a logical destination (ldst), a macro instruction pointer delta value (mipd), and a set of flow markers (flow). The logical sources lsrc1 and lsrc2 and the logical destination ldst each specify an architectural register of the original stream of macro-instructions.

The register alias circuit 34 also receives a set of allocated physical destinations (alloc_pdst_ through alloc_pdst_3) from the allocator circuit 36 over the physical destination bus 56. The physical destinations alloc_pdst_0 through alloc_pdst_3 specify newly allocated physical registers in the reorder circuit 42 for the logical micro-ops lmop_0 through lmop_3. The physical registers in the reorder circuit 42 specified by the physical destinations alloc_pdst_0 through alloc_pdst_3 will hold speculative result data for the physical micro-ops corresponding to the logical micro-ops ops lmop_0 through lmop_3.

The register alias circuit 34 transfers a set of in order physical micro-ops (pmop_0 through pmop_3) over the physical micro-op bus 52. Each physical micro-op comprises an op code, a pair of physical sources (psrc1 and psrc2) and a physical destination (pdst). The physical sources psrc1 and psrc2 each specify a physical register in the reorder circuit 42 or a committed state register in the real register circuit 44. The physical destination pdst specifies a physical register in the reorder circuit 42 to hold speculative result data for the corresponding physical micro-op.

The register alias circuit 34 generates the physical micro-ops pmop_0 through pmop_3 by mapping the logical sources of the logical micro-ops lmop_0 through lmop_3 to the physical registers of the reorder circuit 42 and the committed state registers specified of the real register circuit 44 as specified by the register alias table 80. The register alias circuit 34 merges the physical destinations alloc_pdst_0 through alloc_pdst_3 into the physical destination pdst of the physical micro-ops pmop_0 through pmop_3.

For example, the register alias circuit 34 generates the physical source psrc1 for the physical micro-op pmop_0 by reading the register alias table 80 entry specified by the logical source lsrc1 of the lmop_0. If the rrfv flag of the specified register alias table 80 entry is not set, then the register alias circuit 34 transfers the ROB pointer from the specified register alias table 80 entry along with the rrfv flag over the physical micro-op bus 52 as the physical source psrc1 for the pmop_0. If the rrfv bit is set, then the register alias circuit 34 transfers a pointer to the committed state register in the real register circuit 44 that corresponds to the logical source lsrc1 along with the rrfv flag over the physical micro-op bus 52 as the physical source psrc1 for the pmop_0.

The register alias circuit 34 generates the physical source psrc2 for the physical micro-ops op pmop_0 by reading the register alias table 80 entry that corresponds to the logical source lsrc2 of the lmop_0. If the rrfv flag is not set, then the register alias circuit 34 transfers the ROB pointer from the specified register alias table 80 entry along with the rrfv flag over the physical micro-op bus 52 as the physical source psrc2 for the pmop_0. If the rrfv bit is set, then the register alias circuit 34 transfers a pointer to the committed state register in the real register circuit 44 that corresponds to the logical source lsrc2 along with the rrfv flag over the physical micro-op bus 52 as the physical source psrc2 for the pmop_0.

The register alias circuit 34 stores the physical destination alloc_pdst_0 into the ROB pointer field of the register alias table 80 entry specified by the logical destination ldst of the lmop_0, and clears the corresponding rrfv bit. The clear rrfv bit indicates that the current state of the corresponding architectural register is speculatively held in the physical register of the reorder circuit 42 specified by the corresponding ROB pointer.

The register alias circuit 34 transfers a set of logical destinations (ldst_0 through ldst_3) and corresponding macro instruction pointer delta values (mipd_0 through mipd_3) and flow markers (flow_0 through flow_3) over the logical destination bus 54. The logical destinations ldst_0 through ldst_3 are the logical destinations ldst of the logical micro-ops lmop_0 through lmop_3. The macro instruction pointer delta values mipd_0 through mipd_3 are the macro instruction pointer delta values mipd of the logical micro-ops lmop_0 through lmop_3. The macro instruction pointer delta values mipd_0 through mipd_3 indicate the byte length of the original macro instructions corresponding to the physical micro-ops pmop_0 through pmop_3.

Figure 4:
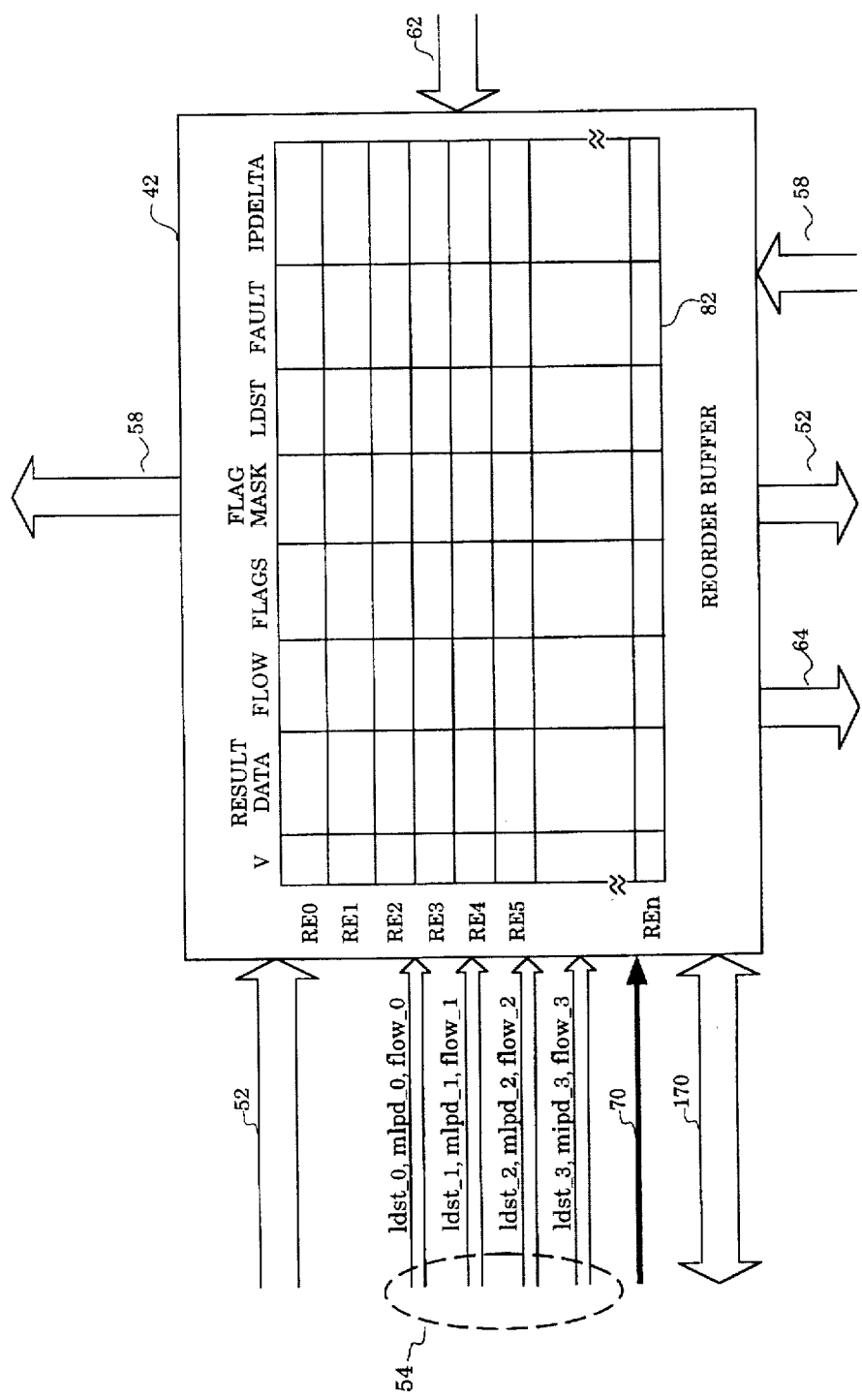
FIG. 4 illustrates the reorder circuit which contains a reorder buffer comprising a set of ROB entries (RE0 through REn) that buffer speculative result data from the out of order speculative execution of physical micro-ops.

FIG. 4 illustrates the reorder circuit 42. The reorder circuit 42 implements a reorder buffer 82 comprising a set of ROB entries (RE0 through REn). The ROB entries RE0 through REn are physical registers that buffer speculative result data from the out of order execution of physical micro-ops. For one embodiment, the ROB entries RE0 through REn comprise a set of 64 physical registers. For another embodiment that minimizes integrated circuit chip area for the processor 22, the ROB entries RE0 through REn comprise a set of 40 physical registers.

Each ROB entry comprises a valid flag (V), a result data value, a set of flags, a flag mask, a logical destination (LDST), fault data, an instruction pointer delta value (IPDELTA) and a set of flow marker bits (FLOW).

The valid flag indicates whether the result data value for the corresponding ROB entry is valid. The reorder circuit 42 clears the valid flag for each newly allocated ROB entry to indicate an invalid result data value. The reorder circuit 42 sets the valid flag when speculative result data is written back to the ROB entry from the execution circuit 40.

The result data value is a speculative result from the out of order execution of the corresponding physical micro-op. The result data value may be either an integer data value or a floating-point data value. For one embodiment, the result data value field of each ROB entry RE0 through REn comprises 86 bits to accommodate both integer and floating-point data values.

The flags and flag mask provide speculative architectural flag information. The speculative architectural flag information is transferred to the architectural flags of the real register circuit 44 upon retirement of the corresponding ROB entry.

The logical destination LDST specifies a committed state register in the real register circuit 44. The result data value of the corresponding ROB entry is transferred to the committed state register specified by LDST during retirement of the ROB entry.

The fault data contains fault information for the corresponding ROB entry. The fault data includes a branch result flag indicating whether the corresponding ROB entry stores speculative result clara from execution of a branch micro-op.

The IPDELTA is a macro instruction pointer delta value that indicates the byte length of the macro instruction that generated the physical micro-op allocated to the corresponding ROB entry.

The reorder circuit 42 receives the physical micro-ops pmop_0 through pmop_3 over the physical micro-op bus 52. The reorder circuit 42 reads the source data specified by the physical micro-ops pmop_0 through pmop_3 from the reorder buffer 82. The reorder circuit 42 transfers the result data values and the valid flags from the ROB entries specified by the physical sources psrc1 and psrc2 of the physical micro-ops to the reservation and dispatch circuit 38 over the source data bus 58.

The reorder circuit 42 clears the valid bits of the ROB entries specified by the physical destinations pdst the physical micro-ops pmop_0 through pmop_3 received over the physical micro-op bus 52. The reorder circuit 42 clears the valid bits to indicate that the corresponding result data value is not valid until the execution circuit 40 writes back results for the physical micro-ops pmop_0 through pmop_3.

The reorder circuit 42 receives the logical destinations ldst_0 through ldst_3, the macro instruction pointer delta values mipd_0 through mipd_3, and the flow markers flow_0 through flow_3 over the logical destination bus 54. The reorder circuit 42 stores the logical destinations ldst_0 through ldst_3 into the LDST fields of the ROB entries specified by the physical destinations pdst the physical micro-ops pmop_0 through pmop_3. The reorder circuit 42 stores the macro instruction pointer delta values mipd_0 through mipd_3 into the IPDELTA fields of the ROB entries specified by the physical destinations pdst the physical micro-ops pmop_0 through pmop_3. The reorder circuit 42 stores the flow markers flow_0 through flow_3 into the FLOW fields of the ROB entries specified by the physical destinations pdst the physical micro-ops pmop_0 through pmop_3.

For example, the reorder circuit 42 stores the ldst_0, the mipd_0, and the flow_0 into the LDST, the IPDELTA, and the FLOW fields of the ROB entry specified by the physical destination pdst of the pmop_0. The logical destination in the LDST field of a ROB entry specifies a committed state register in the real register circuit 44 for retirement of the corresponding ROB entry.

The reorder circuit 42 receives write back speculative result information from the execution circuit 40 over the result bus 62. The write back speculative result information from the execution circuit 40 comprises result data values, physical destinations pdst and fault data.

The reorder circuit 42 stores the write back speculative result information from the execution circuit 40 into the ROB entries specified by the physical destinations pdst on the result bus 62. The reorder circuit 42 stores the result data value into the result data value field, and stores the fault data into the fault data field of the ROB entry specified by the physical destination pdst.

Each result data value from the executions circuit 40 includes a valid flag. Each valid flag is stored in the valid flag field of the ROB entry specified by the physical destination pdst. The valid flags of a ROB entry indicates whether the corresponding result data value is valid.

The reorder circuit 42 receives the retirement physical destinations over the retire notification bus 70. The retirement physical destinations cause the reorder circuit 42 to commit the speculative result data values in the ROB entries RE0 through REn to architectural state by transferring the speculative result data values to the real register circuit 44 over the retirement bus 64.

The reorder circuit 42 reads the ROB entries specified by the retirement pointer on the retire notification bus 70 during a retirement operation. The reorder circuit 42 then transfers a set of retiring micro-ops (rm_0 through rm_4) to the real register circuit 44 over the retirement bus 64. Each retiring micro-op rm_0 through rm_4 comprises a result data value and a logical destination ldst from one of the retiring ROB entries specified by the retirement pointer.

The reorder circuit 42 also transfers the lower 32 bits of the result data values, the macro instruction pointer delta values, and the flow markers for the retiring ROB entries to the retire circuit 46 over the retire control bus 170.

Figure 5:
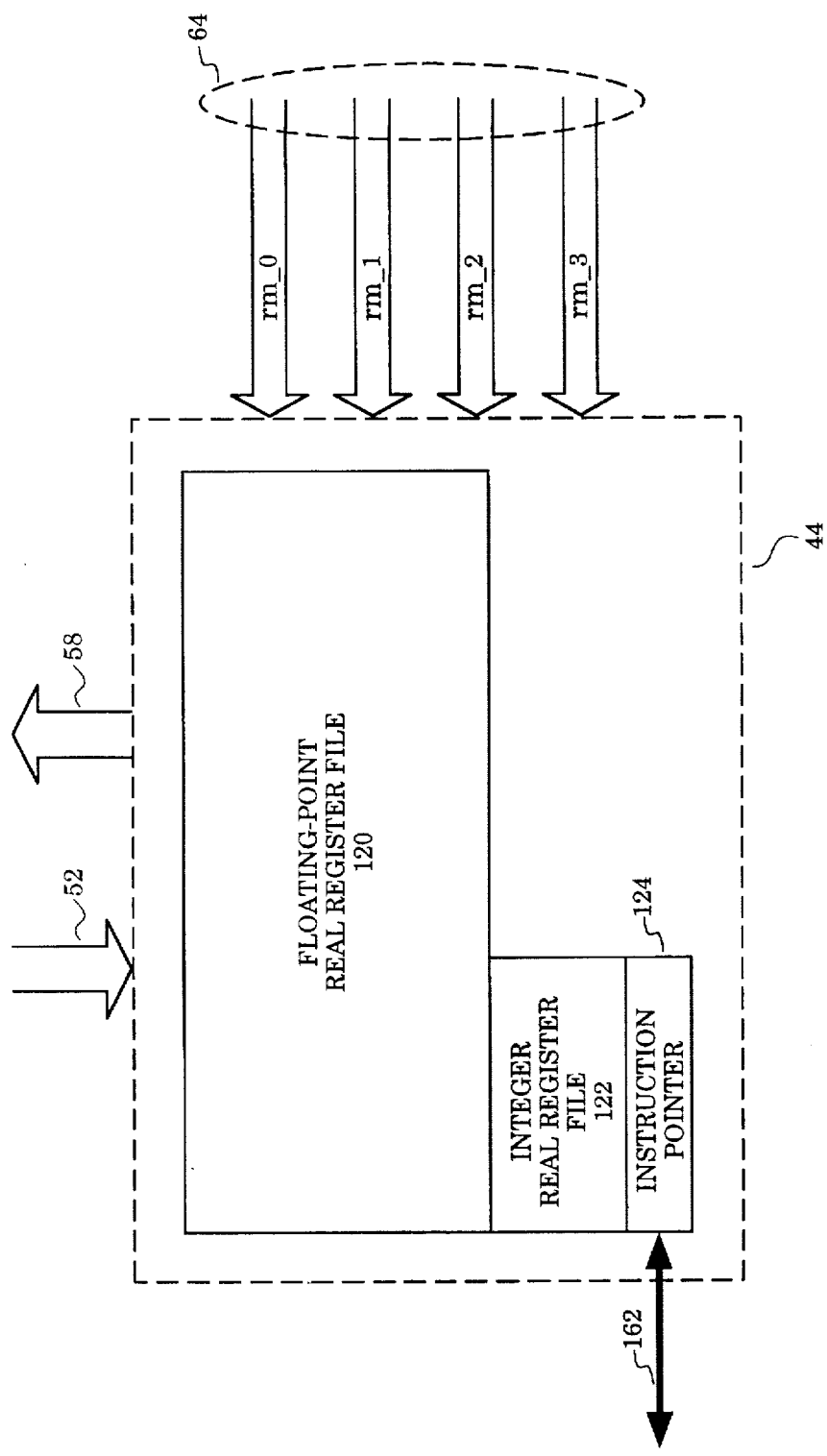
FIG. 5 illustrates the real register circuit which implements a set of committed state registers that hold committed result data values in a floating-point register file and an integer real register file.

FIG. 5 illustrates the real register circuit 44. The real register circuit 44 implements a set of committed state registers that hold committed result data values. The committed state registers in real register circuit 44 are arranged as a floating-point register file 120 and an integer real register file 122. The committed state registers buffer committed results for the architectural registers of the original stream of macro instructions.

The real register circuit 44 also contains an instruction pointer register 124. The instruction pointer register 124 stores the committed state of the instruction pointer for the processor 22. The instruction pointer register 124 is accessed by the retire circuit 46 over the instruction pointer bus 162.

The retire circuit 46 reads from the instruction pointer register 124, updates the instruction pointer value according to the retirement of a set of physical micro ops and then transfers a new instruction pointer value to the instruction pointer register 124 over the instruction pointer bus 162.

The real register circuit 44 receives the physical micro-ops pmop_0 through pmop_3 over the physical micro-op bus 52. The real register circuit 44 reads the result data values from the committed state registers specified by the physical sources psrc1 and psrc2 of the physical micro-ops pmop_0 through pmop_3 from the real register files 120 and 122 if the rrfv flags indicate that the physical sources are retired. The real register circuit 44 then transfers the result data values from the specified committed state registers to the reservation and dispatch circuit 38 over the source data bus 58. The real register circuit 44 always sets the source data valid flags while transferring source data to the reservation and dispatch circuit 38 over the source data bus 58 because the result data in the committed state registers is always valid.

The real register circuit 44 receives the retiring micro-ops rm_0 through rm_3 from the reorder circuit 42 over the retirement bus 64. Each retirement micro-op rm_0 through rm_3 contains speculative results from the retiring ROB entries in the reorder buffer 82.

Each retirement micro-op rm_0 through rm_3 comprises a result data value and a logical destination ldst. The real register circuit 44 stores the result data values of the retirement micro-ops rm_0 through rm_3 into the committed state registers of the real register file 86 specified by the logical destinations ldst the retirement micro-op rm_0 through rm_3.

Figure 6:
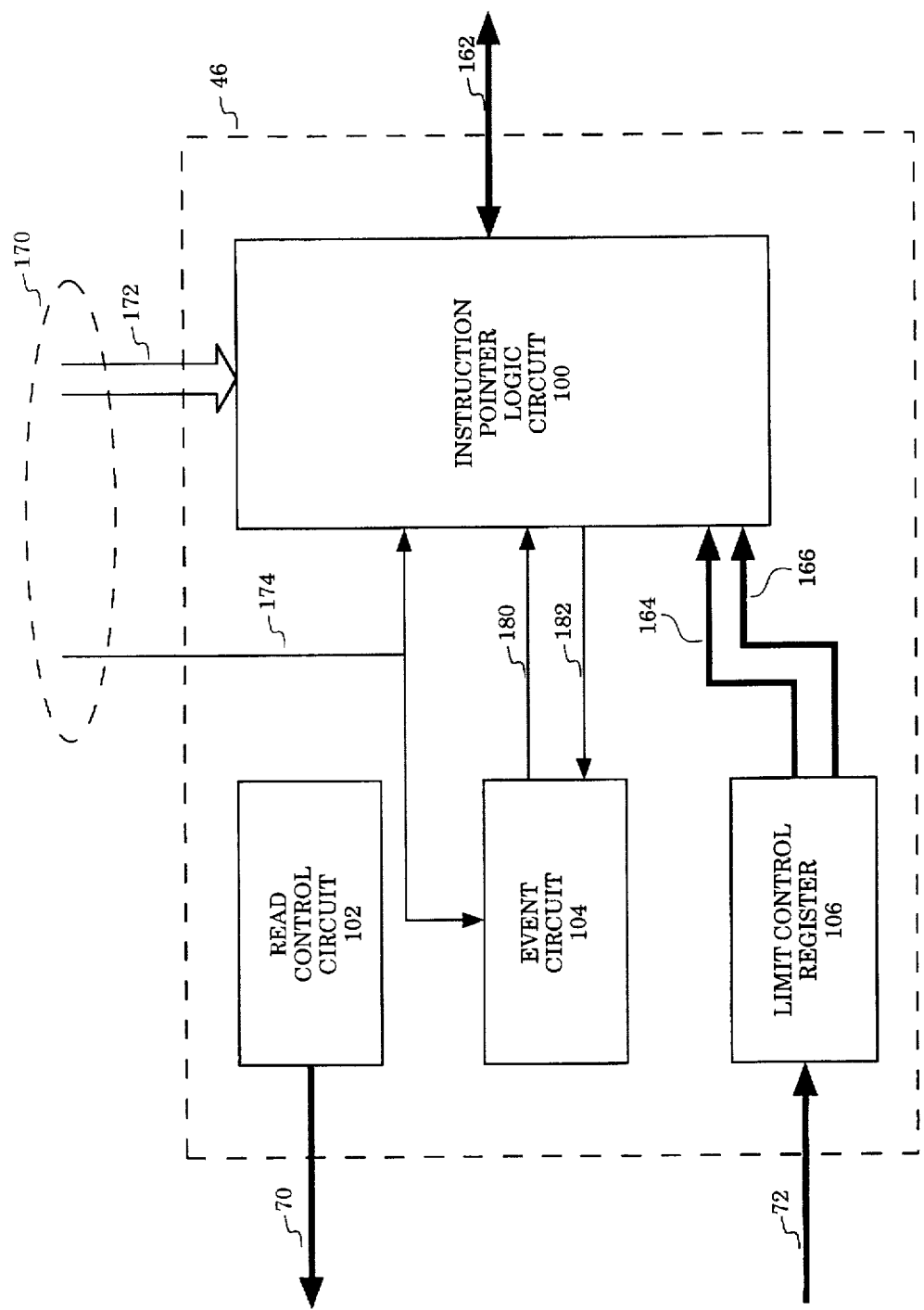
FIG. 6 illustrates the retire circuit which comprises a read control circuit, an event circuit, a limit control register, and an instruction pointer logic circuit.

FIG. 6 illustrates the retire circuit 46. The retire circuit 46 comprises a read control circuit 102, an event circuit 104, a limit control register 106, and an instruction pointer logic circuit 100.

The read control circuit 102 transfers a retirement pointer over the retire notification bus 70. The retirement pointer specifies a set of sequential ROB entries for a retirement operation. For one embodiment, the retirement pointer on the retire notification bus 70 specifies a set of four sequential ROB entries as retiring micro-ops during each clock cycle of the processor 22. For another embodiment that reduces integrated circuit chip area for the processor 22, the retirement pointer on the retire notification bus 70 specifies a set of three sequential ROB entries as retiring micro-ops during each clock cycle of the processor 22.

The limit control register 106 stores a instruction pointer limit value for the processor 22. The limit control register 106 receives updated instruction pointer limit values over the control register bus 72 from the address generation unit in the execution circuit 40. The limit control register 106 transfers a stored instruction pointer limit (IPL) value and a stored instruction pointer limit plus one (IPL+1) value to the instruction pointer logic circuit 100 over signal lines 164 and 166, respectively.

The instruction pointer logic circuit compares the IPL value 164 to the retiring target addresses to determine instruction pointer limit violations. The IPL value 164 is compared to target addresses because a target address greater than or equal to the instruction pointer limit will cause a fetch of an instruction outside the instruction limit.

The instruction pointer logic circuit compares the IPL+1 value 166 to the retiring sequential instruction pointer addresses to determine instruction pointer limit violations. The IPL+1 value 166 is compared to sequential addresses because an updated instruction pointer address equal to the instruction pointer limit may not cause a fetch of an instruction outside the instruction limit. An updated instruction pointer address equal to the instruction pointer limit may straddle the instruction pointer limit at the end of a block of code.

The instruction pointer logic circuit 100 determines an updated instruction pointer value for each retiring micro-op during retirement operations. The instruction pointer logic circuit 100 receives the lower 32 bits of a result data value, an instruction pointer delta value, and a branch flag from the fault data field for each of the retiring ROB entries over a portion 172 of the retirement bus 170. The instruction pointer logic circuit 100 also receives a current instruction pointer value from the instruction pointer register 124 of the real register circuit 44 over the instruction pointer bus 162.

The instruction pointer logic circuit 100 determines an updated instruction pointer value for a retiring micro-op by adding the corresponding instruction pointer delta value to the current instruction pointer delta value if the retiring micro-op has a branch flag indicating a non branch instruction. The instruction pointer logic circuit 100 determines an updated instruction pointer value for a retiring micro-op by selecting the corresponding lower 32 bits of the result data value as the updated current instruction pointer delta value if the retiring micro-op has a branch flag indicating a branch instruction. For a branch instruction, the lower 32 bits of the result data value comprises the target address of the branch instruction.

The instruction pointer logic circuit 100 also determines whether the retiring micro-ops cause instruction pointer limit violations by comparing the updated instruction pointer delta values for each retiring micro-op against an instruction pointer limit. The instruction pointer logic circuit 100 generates a set of limit violation signals 182 that indicate which, if any, of the retiring micro-ops cause a instruction pointer limit violation. The limit violation signals 182 comprise a limit violation signal for each of the retiring micro-ops.

The event circuit 104 receives the flow markers for the retiring ROB entries over a portion 174 of the retirement bus 170. The flow markers for each retiring micro-op may include either a BOM marker or an EOM marker or both. The event circuit 104 also receives the limit violation signals 182 from the instruction pointer logic circuit 100.

For each retiring micro-op having a BOM marker, the event circuit 104 tests the corresponding limit violation signal 182 for a instruction pointer limit violation. The event circuit 104 then generates a set of guarantee signals 180. The guarantee signals 180 indicate which of the physical micro-ops can retire. The event circuit 104 generates the guarantee signals 180 such that retiring micro-ops that cause a code segment violation cannot retire.

For each retiring micro-op having an EOM marker, the instruction pointer logic circuit 100 selects one of the updated instruction pointer values for the retiring micro-ops according to the guarantee signals 180 the branch flags for the retiring micro-ops. The instruction pointer logic circuit 100 then transfers the selected instruction pointer value to the instruction pointer register 124 over the instruction pointer bus 162. The selected instruction pointer value includes only the updated instruction pointer values from the retiring micro-ops selected by the guarantee signals 180.

Figure 7:
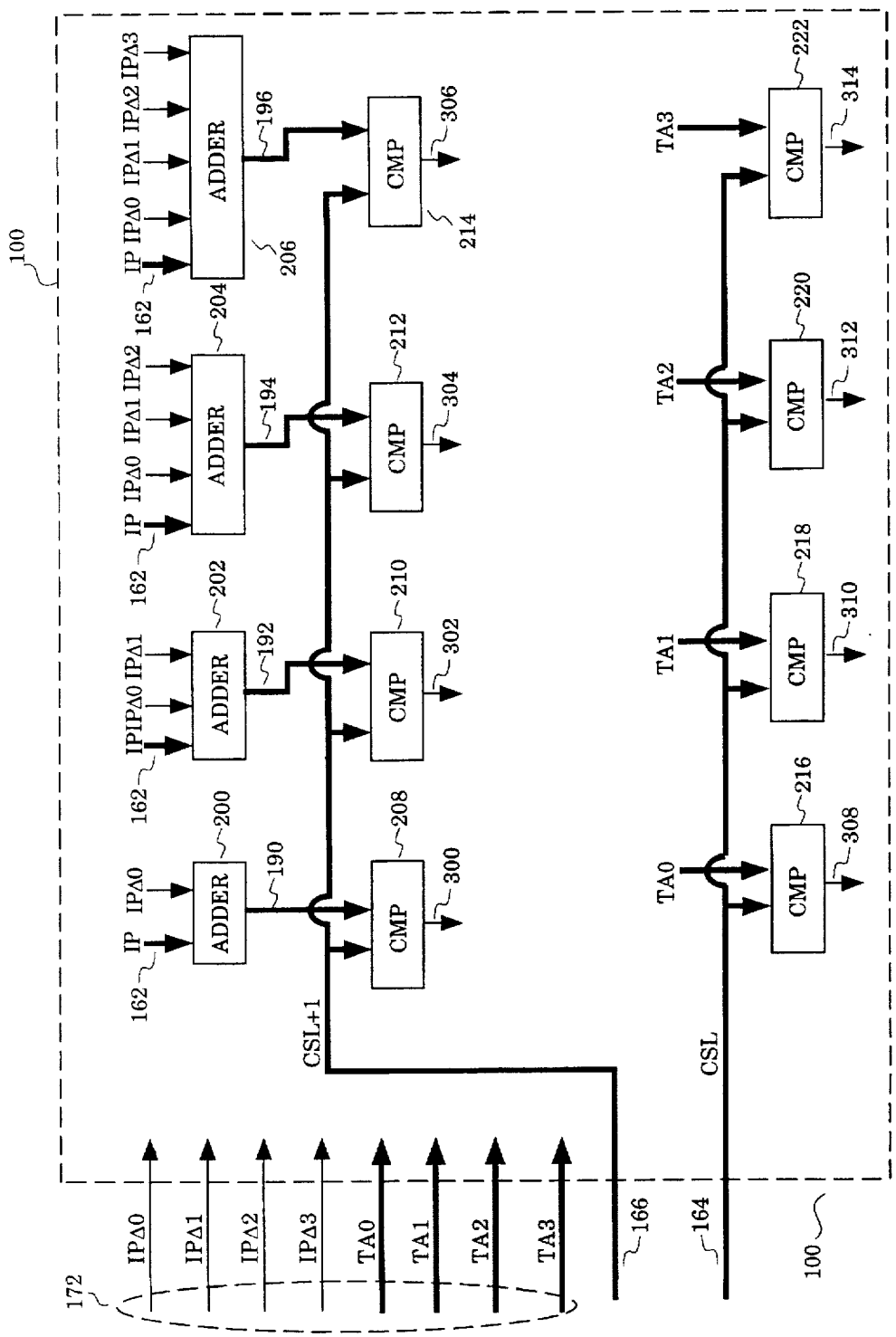
FIG. 7 illustrates circuitry in the instruction pointer logic circuit that determines whether the retiring micro ops cause an instruction pointer limit violation.

FIG. 7 illustrates circuitry in the instruction pointer logic circuit 100 that detects instruction pointer limit violations.

The instruction pointer logic circuit 100 receives the IPL value 164 and the IPL+1 value 166 from the limit control register 106. The instruction pointer logic circuit 100 receives the current instruction pointer value IP from the instruction pointer register 124 over the instruction pointer bus 162.

The instruction pointer logic circuit 100 receives a set of instruction pointer delta values IPΔ0–IPΔ3 from the reorder circuit 42, and a set of target address values TA0–TA3 from the reorder circuit 42. The instruction pointer delta values IPΔ0–IPΔ3 and target address values TA0–TA3 correspond to the ROB entries for the retiring micro ops rm_0 through rm_3. The target address values TA0–TA3 correspond to the lower 32 bits of each result data field of the retiring ROB entries whether or not the corresponding retiring micro-ops are branch instructions.

An adder circuit 200 and a comparator circuit 208 generate a control signal 300 indicating whether the retiring micro op rm_0 causes a instruction pointer limit violation. The adder circuit 200 generates a sum 190 by adding the IP 162 to the instruction pointer delta value IPΔ0. The comparator circuit 208 compares the sum 190 to the IPL+1 value 166. The control signal 300 indicates a instruction pointer limit violation for the retiring micro op rm_0 if the sum 190 is greater than or equal to the IPL+1 value 166.

An adder circuit 202 and a comparator circuit 210 determine whether the retiring micro op rm_1 causes a instruction pointer limit violation. The adder circuit 202 generates a sum 192 of the IP 162 and the instruction pointer delta values IPΔ0 and IPΔ1. The comparator circuit 210 generates a control signal 302 to indicate a instruction pointer limit violation for the retiring micro op rm_1 if the sum 192 is greater than or equal to the IPL+1 value 166.

An adder circuit 204 and comparator circuit 212 determines whether the retiring micro op rm_2 causes a instruction pointer limit violation. The adder circuit 204 generates a sum 194 by adding the IP 162 to the instruction pointer delta values IPΔ0 through IPΔ2. The comparator circuit 212 generates a control signal 304 to indicate a instruction pointer limit violation for the retiring micro op rm_2 if the sum 194 is greater than or equal to the IPL+1 value 166.

An adder circuit 206 and a comparator circuit 214 determine whether the retiring micro op rm_3 causes a instruction pointer limit violation. The adder circuit 206 generates a sum 196 by adding the IP 162 to the instruction pointer delta values IPΔ0 through IPΔ3. The comparator circuit 214 generates a control signal 306 to indicate a instruction pointer limit violation for the retiring micro op rm_3 if the sum 196 is greater than or equal to the IPL+1 value 166.

A set of comparator circuits 216 through 222 determine whether any of the target addresses TA0–TA3 of the retiring micro-ops rm_0 through rm_3 cause a instruction pointer limit violation. The comparator circuit 216 generates a control signal 308 to indicate a instruction pointer limit violation for the retiring micro op rm_0 if the target address TA0 is greater than or equal to the IPL value 164. The comparator circuit 218 generates a control signal 310 to indicate a instruction pointer limit violation for the retiring micro op rm_1 if the target address TA1 is greater than or equal to the IPL value 164. The comparator circuit 220 generates a control signal 312 to indicate a instruction pointer limit violation for the retiring micro op rm_2 if the target address TA2 is greater than or equal to the IPL value 164. The comparator circuit 222 generates a control signal 314 to indicate a instruction pointer limit violation for the retiring micro op rm_3 if the target address TA3 is greater than or equal to the IPL value 164.

One of the sums 190–196 provides an updated instruction pointer value if none of the retiring micro-ops rm_0 through rm_3 are branch instructions. The sum 190 is selected as the updated instruction pointer value if only the micro-op rm_0 retires according to the guarantee signals 180. The sum 192 is selected as the updated instruction pointer value if only the micro-ops rm_0 and rm_1 retire according to the guarantee signals 180. The sum 194 is selected as the updated instruction pointer value if only the micro-ops rm_0 through rm_2 retire according to the guarantee signals 180. The sum 196 is selected as the updated instruction pointer value if the micro-ops rm_0 through rm_3 retire according to the guarantee signals 180.

Figure 8:
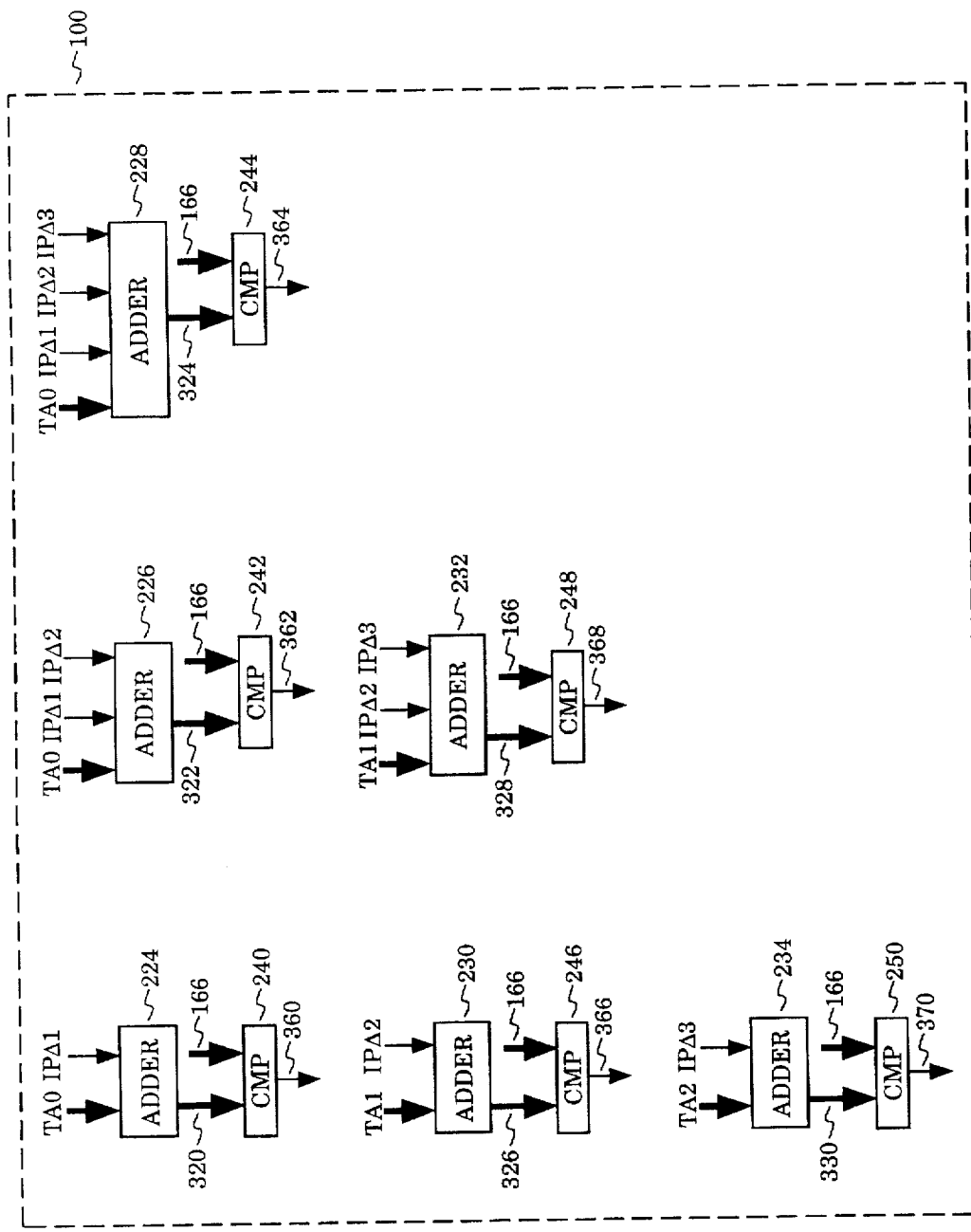
FIG. 8 illustrates additional circuitry in the instruction pointer logic circuit that determines whether the retiring micro ops cause an instruction pointer limit violation.

FIG. 8 illustrates additional circuitry in the instruction pointer logic circuit 100 that determines whether the retiring micro ops rm_0 through rm_3 cause an instruction pointer limit violation.

An adder circuit 224 generates a sum 320 by adding the target address TA0 and the IP delta value IPΔ1. A comparator circuit 240 generates a control signal 360. The control signal 360 indicates an instruction pointer limit violation if the retiring micro-op rm_0 is a branch instruction to the target address TA0 and if the micro-ops rm_0 and rm_1 retire according to the guarantee signals 180.

The sum 320 is selected as the updated instruction pointer value if the retiring micro-op rm_0 is a branch instruction to the target address TA0 and if only the micro-ops rm_0 and rm_1 retire according to the guarantee signals 180. The target address TA0 is selected as the updated instruction pointer value if the retiring micro-op rm_0 is a branch instruction to the target address TA0 and if only the micro-op rm_0 retires according to the guarantee signals 180.

An adder circuit 226 generates a sum 322 by adding the target address TA0 and the IP delta values IPΔ1 and IPΔ2. A comparator circuit 242 generates a control signal 362 indicating an instruction pointer limit violation if the retiring micro-op rm_0 is a branch instruction to the target address TA0 and if the micro-ops rm_0 through rm_2 retire according to the guarantee signals 180.

The sum 322 is selected as the updated instruction pointer value if the retiring micro-op rm_0 is a branch instruction to the target address TA0 and if only the micro-ops rm_0 through rm_2 retire according to the guarantee signals 180.

An adder circuit 228 generates a sum 324 by adding the target address TA0 and the IP delta values IPΔ1 through 3. A comparator circuit 244 generates a control signal 364 indicating an instruction pointer limit violation if the retiring micro-op rm_0 is a branch instruction to the target address TA0 and if the micro-ops rm_0 through rm_3 retire according to the guarantee signals 180.

The sum 324 is selected as the updated instruction pointer value if the retiring micro-op rm_0 is a branch instruction to the target address TA0 and if the micro-ops rm_0 through rm_3 retire according to the guarantee signals 180.

An adder circuit 230 generates a sum 326 by adding the target address TA1 and the instruction pointer delta value IPΔ2. A comparator circuit 246 generates a control signal 366 indicating an instruction pointer limit violation if the retiring micro-op rm_1 is a branch instruction to the target address TA1 and if the micro-ops rm_0 through rm_2 retire according to the guarantee signals 180.

The sum 326 is selected as the updated instruction pointer value if the retiring micro-op rm_1 is a branch instruction to the target address TA1 and if only the micro-ops rm_0 through rm_2 retire according to the guarantee signals 180. The target address TA1 is selected as the updated instruction pointer value if the retiring micro-op rm_1 is a branch instruction to the target address TA1 and if only the micro-ops rm_0 and rm_1 retire according to the guarantee signals 180.

An adder circuit 232 generates a sum 328 by adding the target address TA1 and the IP delta values IPΔ2 and IPΔ3. A comparator circuit 248 generates a control signal 368 indicating an instruction pointer limit violation if the retiring micro-op rm_1 is a branch instruction to the target address TA1 and if the micro-ops rm_0 through rm_3 retire according to the guarantee signals 180.

The sum 328 is selected as the updated instruction pointer value if the retiring micro-op rm_1 is a branch instruction to the target address TA1 and if the micro-ops rm_0 through rm_3 retire according to the guarantee signals 180.

An adder circuit 234 generates a sum 330 by adding the target address TA2 and the instruction pointer delta value IPΔ3. A comparator circuit 250 generates a control signal 370 an instruction pointer limit violation if the retiring micro-op rm_2 is a branch instruction to the target address TA2 and if the micro-ops rm_0 through rm_3 retire according to the guarantee signals 180.

The sum 330 is selected as the updated instruction pointer value if the retiring micro-op rm_2 is a branch instruction to the target address TA2 and if the micro-ops rm_0 through rm_3 retire according to the guarantee signals 180. The target address TA3 is selected as the updated instruction pointer value if the retiring micro-op rm_3 is a branch instruction to the target address TA3 and if the micro-ops rm_0 through rm_3 retire according to the guarantee signals 180.

Figure 9:
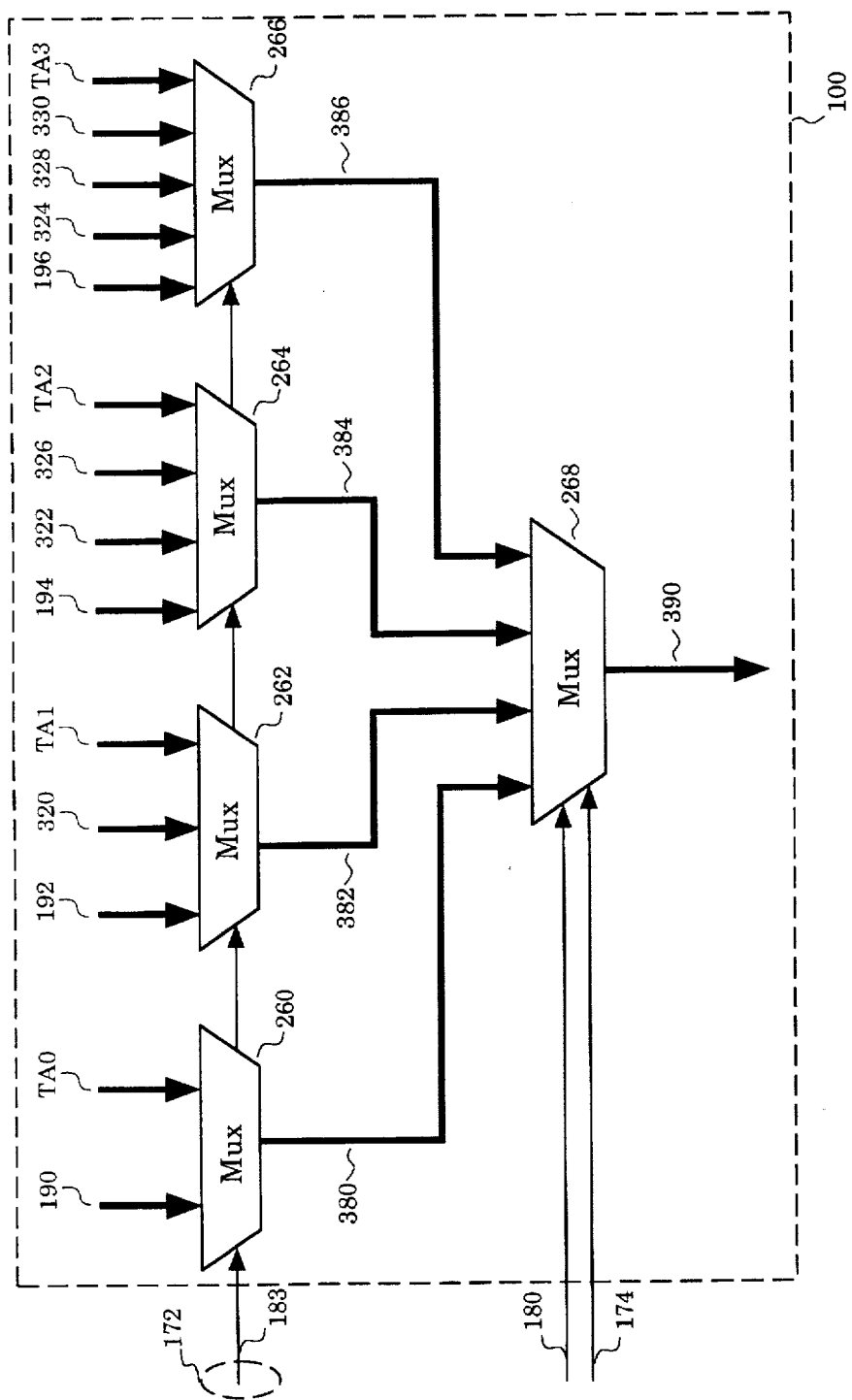
FIG. 9 illustrates circuitry of the instruction pointer logic circuit that selects an updated instruction pointer value for the instruction pointer register.

FIG. 9 illustrates circuitry of the instruction pointer logic circuit 100 for selecting an updated instruction pointer value 390. The instruction pointer logic circuit 100 transfers the updated instruction pointer value 390 to the instruction pointer register 124 over the instruction pointer bus 162.

A set of multiplexers 260 through 266 are controlled by a set of branch signals 183. The branch signals 183 are the branch flags received over the portion 172 of the retirement bus 170 for the retiring micro-ops rm_0 through rm_3. A multiplexer 268 is controlled by the guarantee signals 180 and the flow markers 174 for the retiring micro-ops rm_0 through rm_3.

The multiplexer circuit 260 selects an IP value 380 from the target address TA0 and the sum 190 according the branch signals 183. The multiplexer circuit 260 couples the target address TA0 to the IP value 380 if the branch signals 183 indicate that the retiring micro-op rm_0 is a branch. If the retiring micro-op rm_0 is not a branch, the multiplexer circuit 260 couples the sum 190 to the IP value 380.

The multiplexer circuit 262 selects an IP value 382 from the sum 192, the sum 320, and the target address TA1. The multiplexer circuit 262 couples the target address TA1 to the IP value 382 if the branch signals 183 indicate that the retiring micro-op rm_1 is a branch. If the retiring micro-op rm_1 is not a branch, the multiplexer circuit 262 couples the sum 320 to the IP value 382 if the branch signals 183 indicate that the retiring micro-op rm_0 is a branch. Otherwise, the multiplexer circuit 262 couples the sum 192 to the IP value 382.

The multiplexer circuit 264 selects an IP value 384 from the sum 194, the sum 322, the sum 326, and the target address TA2. The multiplexer circuit 264 couples the target address TA2 to the IP value 384 if the branch signals 183 indicate that the retiring micro-op rm_2 is a branch. If the retiring micro-op rm_2 is not a branch, the multiplexer circuit 264 couples the sum 326 to the IP value 384 if the branch signals 183 indicate that the retiring micro-op rm_1 is a branch. If retiring micro-ops rm_1 and rm_2 are not branches, the multiplexer circuit 264 couples the sum 322 to the IP value 384 if the branch signals 183 indicate that the retiring micro-op rm_0 is a branch. Otherwise, the multiplexer circuit 264 couples the sum 194 to the IP value 384.

The multiplexer circuit 266 selects an IP value 386 from the sum 196, the sum 324, the sum 328, the sum 330, and the target address TA3. The multiplexer circuit 266 couples the target address TA3 to the IP value 386 if the branch signals 183 indicate that the retiring micro-op rm_3 is a branch. If the retiring micro-op rm_3 is not a branch, the multiplexer circuit 266 couples the sum 330 to the IP value 386 if the branch signals 183 indicate that the retiring micro-op rm_2 is a branch. If retiring micro-ops rm_2 and rm_3 are not branches, the multiplexer circuit 266 couples the sum 328 to the IP value 386 if the branch signals 183 indicate that the retiring micro-op rm_1 is a branch. If retiring micro-ops rm_1 through rm_3 are not branches, the multiplexer circuit 266 couples the sum 324 to the IP value 386 if the branch signals 183 indicate that the retiring micro-op rm_0 is a branch. Otherwise, the multiplexer circuit 266 couples the sum 196 to the IP value 386.

The multiplexer circuit 268 selects the updated IP value 390 from the IP values 380–386. The multiplexer circuit 268 couples the IP value 386 to the updated IP value 390 if the guarantee signals 180 indicate that the retiring micro-op rm_3 is guaranteed to retire and if the flow markers 174 indicate a EOM marker for the retiring micro-op rm_3.

If the retiring micro-op rm_3 is not guaranteed to retire or does not have an EOM marker, the multiplexer circuit 268 couples the IP value 384 to the updated IP value 390 if the guarantee signals 180 and the flow markers 174 indicate that the retiring micro-op rm_2 is guaranteed to retire and has an EOM marker.

If the retiring micro-op rm_3 is not guaranteed to retire or does not have an EOM marker or if the retiring micro-op rm_2 is not guaranteed to retire or does not have an EOM marker, the multiplexer circuit 268 couples the IP value 382 to the updated IP value 390 if the guarantee signals 180 and the flow markers 174 indicate that the retiring micro-op rm_1 is guaranteed to retire and has an EOM marker.

If the retiring micro-op rm_3 is not guaranteed to retire or does not have an EOM marker or if the retiring micro-op rm_2 is not guaranteed to retire or does not have an EOM marker or if the retiring micro-op rm_1 is not guaranteed to retire or does not have an EOM marker, the multiplexer circuit 268 couples the IP value 380 to the updated IP value 390 if the guarantee signals 180 and the flow markers 174 indicate that the retiring micro-op rm_0 is guaranteed to retire and has an EOM marker.

Otherwise, if the guarantee signals 180 indicate that none of the retiring micro-ops rm_0—rm_3 are guaranteed to retire then the updated IP value 390 is equal to the current IP value 162.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for enforcing an instruction pointer limit in an out-of-order processor, comprising the steps of:

reading a set of reorder buffer entries, the reorder buffer entries storing a set of result data values from out-of-order speculative execution of a set of instructions, wherein the reorder buffer entries comprise a first and a second reorder buffer entry, a first instruction corresponding to the first reorder buffer entry occurring before a second instruction corresponding to the second reorder buffer entry;

determining a speculative instruction pointer for each reorder buffer entry, wherein a first speculative instruction pointer for the first reorder buffer entry is determined by adding an instruction pointer to an instruction pointer delta value from the first reorder buffer entry that indicates a length of the first instruction, and a second speculative instruction pointer for the second reorder buffer entry is determined by adding the instruction pointer to the instruction pointer delta value for the first instruction and an instruction pointer delta value from the second reorder buffer entry that indicates a length of the second instruction;

determining whether each speculative instruction pointer exceeds the instruction pointer limit; and committing the result data value of each reorder buffer entry to the architectural state if the speculative instruction pointer for the result data value does not exceed the instruction pointer limit.

2. The method of claim 1, wherein the step of determining whether each speculative instruction pointer exceeds the instruction pointer limit comprises the steps of:

determining that the speculative instruction pointer for the first reorder buffer entry exceeds the instruction pointer limit if the speculative instruction pointer for the first reorder buffer entry is greater than or equal to the instruction pointer limit plus one;

determining that the speculative instruction pointer for the second reorder buffer entry exceeds the instruction pointer limit if the speculative instruction pointer for the second reorder buffer entry is greater than or equal to the instruction pointer limit plus one.

3. The method of claim 1, wherein the step of determining a speculative instruction pointer for each reorder buffer entry comprises the steps of:

determining a speculative instruction pointer for the first reorder buffer entry equal to a result data value from the first reorder buffer entry;

determining a speculative instruction pointer for the second reorder buffer entry equal to a result data value from the second reorder buffer entry.

4. The method of claim 3, wherein the step of determining whether each speculative instruction pointer exceeds the instruction pointer limit comprises the steps of:

determining that the speculative instruction pointer for the first reorder buffer entry exceeds the instruction pointer limit if the result data value for the first reorder buffer entry is greater than or equal to the instruction pointer limit plus one;

determining that the speculative instruction pointer for the second reorder buffer entry exceeds the instruction pointer limit if the result data value for the second reorder buffer entry is greater than or equal to the instruction pointer limit plus one.

5. The method of claim 1, wherein the reorder buffer entries further comprise a third reorder buffer entry that occurs after the second reorder buffer entry in the sequential program order.

6. The method of claim 5, wherein the step of determining a speculative instruction pointer for each reorder buffer entry further comprises the step of:

determining a speculative instruction pointer for the third reorder buffer entry by adding the instruction pointer, the instruction pointer delta value from the first reorder buffer entry, the instruction pointer delta value from the second reorder buffer entry, and an instruction pointer delta value from the third reorder buffer entry, the instruction pointer delta value from the third reorder buffer entry indicating a length of the instruction corresponding to the third reorder buffer entry.

7. The method of claim 6, wherein the step of determining whether each speculative instruction pointer exceeds the instruction pointer limit comprises the steps of:

determining that the speculative instruction pointer for the first reorder buffer entry exceeds the instruction pointer limit if the speculative instruction pointer for the first reorder buffer entry is greater than or equal to the instruction pointer limit plus one;

determining that the speculative instruction pointer for the second reorder buffer entry exceeds the instruction pointer limit if the speculative instruction pointer for the second reorder buffer entry is greater than or equal to the instruction pointer limit plus one;

determining that the speculative instruction pointer for the third reorder buffer entry exceeds the instruction pointer limit if the speculative instruction pointer for the third reorder buffer entry is greater than or equal to the instruction pointer limit plus one.

8. The method of claim 5, wherein the step of determining a speculative instruction pointer each reorder buffer entry comprises the steps of:

determining a speculative instruction pointer for the first reorder buffer entry equal to a result data value from the first reorder buffer entry;

determining a speculative instruction pointer for the second reorder buffer entry equal to a result data value from the second reorder buffer entry;

determining a speculative instruction pointer for the third reorder buffer entry equal to a result data value from the third reorder buffer entry.

9. The method of claim 8, wherein the step of determining whether each speculative instruction pointer exceeds the instruction pointer limit comprises the steps of:

determining that the speculative instruction pointer for the first reorder buffer entry exceeds the instruction pointer limit if the result data value for the first reorder buffer entry is greater than or equal to the instruction pointer limit plus one;

determining that the speculative instruction pointer for the second reorder buffer entry exceeds the instruction pointer limit if the result data value for the second reorder buffer entry is greater than or equal to the instruction pointer limit plus one;

determining that the speculative instruction pointer for the third reorder buffer entry exceeds the instruction pointer limit if the result data value for the third reorder buffer entry is greater than or equal to the instruction pointer limit plus one.

10. The method of claim 5, wherein the reorder buffer entries further comprise a fourth reorder buffer entry that occurs after the third reorder buffer entry in the sequential program order.

11. The method of claim 10, wherein the step of determining a speculative instruction pointer each reorder buffer entry further comprises the steps of:

determining a speculative instruction pointer for the third reorder buffer entry by adding the instruction pointer, the instruction pointer delta value from the first reorder buffer entry, the instruction pointer delta value from the third reorder buffer entry, and an instruction pointer delta value from the second reorder buffer entry, the instruction pointer delta value from the third reorder buffer entry indicating a length of the instruction corresponding to the second reorder buffer entry; and determining a speculative instruction pointer for the fourth reorder buffer entry by adding the instruction pointer, the instruction pointer delta value from the first reorder buffer entry, the instruction pointer delta value from the second reorder buffer entry, the instruction pointer delta value from the third reorder buffer entry, and an instruction pointer delta value from the fourth reorder buffer entry, the instruction pointer delta value from the fourth reorder buffer entry indicating a length of the instruction corresponding to the fourth reorder buffer entry.

12. The method of claim 11, wherein the step of determining whether each speculative instruction pointer exceeds the instruction pointer limit comprises the steps of:

determining that the speculative instruction pointer for the first reorder buffer entry exceeds the instruction pointer limit if the speculative instruction pointer for the first reorder buffer entry is greater than or equal to the instruction pointer limit plus one;

determining that the speculative instruction pointer for the second reorder buffer entry exceeds the instruction pointer limit if the speculative instruction pointer for the second reorder buffer entry is greater than or equal to the instruction pointer limit plus one;

determining that the speculative instruction pointer for the third reorder buffer entry exceeds the instruction pointer limit if the speculative instruction pointer for the third reorder buffer entry is greater than or equal to the instruction pointer limit plus one;

determining that the speculative instruction pointer for the fourth reorder buffer entry exceeds the instruction pointer limit if the speculative instruction pointer for the fourth reorder buffer entry is greater than or equal to the instruction pointer limit plus one.

13. The method of claim 10, wherein the step of determining a speculative instruction pointer each reorder buffer entry comprises the steps of:

determining a speculative instruction pointer for the first reorder buffer entry equal to a result data value from the first reorder buffer entry;

determining a speculative instruction pointer for the second reorder buffer entry equal to a result data value from the second reorder buffer entry;

determining a speculative instruction pointer for the third reorder buffer entry equal to a result data value from the third reorder buffer entry;

determining a speculative instruction pointer for the fourth reorder buffer entry equal to a result data value from the fourth reorder buffer entry.

14. The method of claim 13, wherein the step of determining whether each speculative instruction pointer exceeds the instruction pointer limit comprises the steps of:

determining that the speculative instruction pointer for the first reorder buffer entry exceeds the instruction pointer limit if the result data value for the first reorder buffer entry is greater than or equal to the instruction pointer limit plus one;

determining that the speculative instruction pointer for the second reorder buffer entry exceeds the instruction pointer limit if the result data value for the second reorder buffer entry is greater than or equal to the instruction pointer limit plus one;

determining that the speculative instruction pointer for the third reorder buffer entry exceeds the instruction pointer limit if the result data value for the third reorder buffer entry is greater than or equal to the instruction pointer limit plus one;

determining that the speculative instruction pointer for the fourth reorder buffer entry exceeds the instruction pointer limit if the result data value for the fourth reorder buffer entry is greater than or equal to the instruction pointer limit plus one.

15. A circuit for enforcing an instruction pointer limit in an out-of-order processor, comprising:

a circuit for reading a set of reorder buffer entries, the reorder buffer entries storing a set of result data values from out-of-order speculative execution of a set of instructions, wherein the reorder buffer entries comprise a first and a second reorder buffer entry, a first instruction corresponding to the first reorder buffer entry occurring before a second instruction corresponding to the second reorder buffer entry;

a circuit for determining a speculative instruction pointer for each reorder buffer entry, wherein a first speculative instruction pointer for the first reorder buffer entry is determined by adding an instruction pointer to an instruction pointer delta value from the first reorder buffer entry that indicates a length of the first instruction, and a second speculative instruction pointer for the second reorder buffer entry is determined by adding the instruction pointer to the instruction pointer delta value for the first instruction and an instruction pointer delta value from the second reorder buffer entry that indicates a length of the second instruction;

a circuit for determining whether each speculative instruction pointer exceeds the instruction pointer limit; and a circuit for committing the result data value of each reorder buffer entry to the architectural state if the speculative instruction pointer of the result data value does not exceed the instruction pointer limit.

16. The circuit of claim 15, wherein the circuit for determining whether each speculative instruction pointer exceeds the instruction pointer limit comprises:

a circuit for determining that the speculative instruction pointer for the first reorder buffer entry exceeds the instruction pointer limit if the speculative instruction pointer for the first reorder buffer entry is greater than or equal to the instruction pointer limit plus one;

a circuit for determining that the speculative instruction pointer for the second reorder buffer entry exceeds the instruction pointer limit if the speculative instruction pointer for the second reorder buffer entry is greater than or equal to the instruction pointer limit plus one.

17. The circuit of claim 15, wherein the circuit for determining a speculative instruction pointer each reorder buffer entry comprises:

a circuit for determining a speculative instruction pointer for the first reorder buffer entry equal to a result data value from the first reorder buffer entry;

a circuit for determining a speculative instruction pointer for the second reorder buffer entry equal to a result data value from the second reorder buffer entry.

18. The circuit of claim 17, wherein the circuit for determining whether each speculative instruction pointer exceeds the instruction pointer limit comprises:

a circuit for determining that the speculative instruction pointer for the first reorder buffer entry exceeds the instruction pointer limit if the result data value for the first reorder buffer entry is greater than or equal to the instruction pointer limit plus one;

a circuit for determining that the speculative instruction pointer for the second reorder buffer entry exceeds the instruction pointer limit if the result data value for the second reorder buffer entry is greater than or equal to the instruction limit plus one.

19. The circuit of claim 15, wherein the reorder buffer entries further comprise a third reorder buffer entry that occurs after the second reorder buffer entry in the sequential program order.

20. The circuit of claim 19, wherein the circuit for determining a speculative instruction pointer each reorder buffer entry further comprises:

a circuit for determining a speculative instruction pointer for the third reorder buffer entry by adding the instruction pointer, the instruction pointer delta value from the first reorder buffer entry, the instruction pointer delta value from the second reorder buffer entry, and an instruction pointer delta value from the third recorder buffer entry, the instruction pointer delta value from the third reorder buffer entry indicating a length of the instruction corresponding to the third reorder buffer entry.

21. The circuit of claim 20, wherein the circuit for determining whether each speculative instruction pointer exceeds the instruction pointer limit comprises:

a circuit for determining that the speculative instruction pointer for the first reorder buffer entry exceeds the instruction pointer limit if the speculative instruction pointer of the first reorder buffer entry is greater than or equal to the instruction pointer limit plus one;

a circuit for determining that the speculative instruction pointer for the second reorder buffer entry exceeds the instruction pointer limit if the speculative instruction pointer for the second reorder buffer entry is greater than or equal to the instruction pointer limit plus one; and a circuit for determining tat the speculative instruction pointer for the third reorder buffer entry exceeds the instruction pointer limit if the speculative instruction pointer for the third reorder buffer entry is greater than or equal to the instruction pointer limit plus one.

22. The circuit of claim 19, wherein the circuit for determining a speculative instruction pointer each reorder buffer entry comprises:

a circuit for determining a speculative instruction pointer for the first reorder buffer entry equal to a result data value from the first reorder buffer entry;

a circuit for determining a speculative instruction pointer for the second reorder buffer entry equal to a result data value from the second reorder buffer entry;

a circuit for determining a speculative instruction pointer for the third reorder buffer entry equal to a result data value from the third reorder buffer entry.

23. The circuit of claim 22, wherein the circuit for determining whether each speculative instruction pointer exceeds the instruction pointer limit comprises:

a circuit for determining that the speculative instruction pointer for the first reorder buffer entry exceeds the instruction pointer limit if the result data value for the first reorder buffer entry is greater than or equal to the instruction pointer limit plus one;

a circuit for determining that the speculative instruction pointer for the second reorder buffer entry exceeds the instruction pointer limit if the result data value for the second reorder buffer entry is greater than or equal to the instruction pointer limit plus one;

a circuit for determining that the speculative instruction pointer for the third reorder buffer entry exceeds the instruction pointer limit if the result data value for the third reorder buffer entry is greater than or equal to the instruction pointer limit plus one.

24. The circuit of claim 19, wherein the reorder buffer entries further comprise a fourth reorder buffer entry that occurs after the third reorder buffer entry in the sequential program order.

25. The circuit of claim 24, wherein the circuit for determining a speculative instruction pointer each reorder buffer entry further comprises:

a circuit for determining a speculative instruction pointer for the third reorder buffer entry by adding the instruction pointer, the instruction pointer delta value from the first reorder buffer entry, the instruction pointer delta value from the third reorder buffer entry, and an instruction pointer delta value from the second reorder buffer entry, the instruction pointer delta value from the third reorder buffer entry indicating a length of the instruction corresponding to the second reorder buffer entry; and a circuit for determining a speculative instruction pointer for the fourth reorder buffer entry by adding the instruction pointer, the instruction pointer delta value from the first reorder buffer entry, the instruction pointer delta value from the second reorder buffer entry, the instruction pointer delta value from the third reorder buffer entry, and an instruction pointer delta value from the fourth reorder buffer entry, the instruction pointer delta value from the fourth reorder buffer entry indicating a length of the instruction corresponding to the fourth reorder buffer entry.

26. The circuit of claim 25, wherein the circuit for determining whether each speculative instruction pointer exceeds the instruction pointer limit comprises:

a circuit for determining that the speculative instruction pointer for the first reorder buffer entry exceeds the instruction pointer limit if the speculative instruction pointer for the first reorder buffer entry is greater than or equal to the instruction pointer limit plus one;

a circuit for determining that the speculative instruction pointer for the second reorder buffer entry exceeds the instruction pointer limit if the speculative instruction pointer for the second reorder buffer entry is greater than or equal to the instruction pointer limit plus one;

a circuit for determining that the speculative instruction pointer for the third reorder buffer entry exceeds the instruction pointer limit if the speculative instruction pointer for the third reorder buffer entry is greater than or equal to the instruction pointer limit plus one;

a circuit for determining that the speculative instruction pointer for the fourth reorder buffer entry exceeds the instruction pointer limit if the speculative instruction pointer for the fourth reorder buffer entry is greater than or equal to the instruction pointer limit plus one.

27. The circuit of claim 24, wherein the circuit for determining a speculative instruction pointer each reorder buffer entry comprises:

a circuit for determining a speculative instruction pointer for the first reorder buffer entry equal to a result data value from the first reorder buffer entry;

a circuit for determining a speculative instruction pointer for the second reorder buffer entry equal to a result data value from the second reorder buffer entry;

a circuit for determining a speculative instruction pointer for the third reorder buffer entry equal to a result data value from the third reorder buffer entry;

a circuit for determining a speculative instruction pointer for the fourth reorder buffer entry equal to a result data value from the fourth reorder buffer entry.

28. The circuit of claim 27, wherein the circuit for determining whether each speculative instruction pointer exceeds the instruction pointer limit comprises:

a circuit for determining that the speculative instruction pointer for the first reorder buffer entry exceeds the instruction pointer limit if the result data value for the first reorder buffer entry is greater than or equal to the instruction pointer limit plus one;

a circuit for determining that the speculative instruction pointer for the second reorder buffer entry exceeds the instruction pointer limit if the result data value for the second reorder buffer entry is greater than or equal to the instruction pointer limit plus one;

a circuit for determining that the speculative instruction pointer for the third reorder buffer entry exceeds the instruction pointer limit if the result data value for the third reorder buffer entry is greater than or equal to the instruction pointer limit plus one;

a circuit for determining that the speculative instruction pointer for the fourth reorder buffer entry exceeds the instruction pointer limit if the result data value for the fourth reorder buffer entry is greater than or equal to the instruction pointer limit plus one.

29. A circuit for enforcing an instruction pointer limit in an out-of-order processor, comprising:

a read control circuit reading a set of reorder buffer entries, the reorder buffer entries storing a set of result data values from out-of-order speculative execution of a set of instructions, wherein the reorder buffer entries comprise a first and a second reorder buffer entry, a first instruction corresponding to the first reorder buffer entry occurring before a second instruction corresponding to the second reorder buffer entry;

an instruction pointer logic circuit determining a speculative instruction pointer for each reorder buffer entry, comprising:

a first adder circuit generating a speculative instruction pointer for the first reorder buffer entry by adding an instruction pointer to an instruction pointer delta value from the first reorder buffer entry, the instruction pointer delta value from the first reorder buffer entry indicates a length of the instruction corresponding to the first reorder buffer entry, and a second adder circuit a speculative instruction pointer for the second reorder buffer entry by adding the instruction pointer, the instruction pointer delta value from the first reorder buffer entry, and an instruction pointer delta value from the second reorder buffer entry, the instruction pointer delta value from the second reorder buffer entry indicating a length of the instruction corresponding to the second reorder buffer entry, the instruction pointer logic circuit determining whether each speculative instruction pointer exceeds the instruction pointer limit;

an event circuit committing the result data value of each reorder buffer entry to the architectural state if the speculative instruction pointer for the result data value does not exceed the instruction pointer limit.

30. The circuit of claim 29, wherein the instruction pointer logic circuit further comprises:
- a first comparator circuit determining whether the speculative instruction pointer for the first reorder buffer entry is greater than or equal to the instruction pointer limit plus one;
- a second comparator circuit determining whether the speculative instruction pointer for the second reorder buffer entry is greater than or equal to the instruction pointer limit plus one.

31. The circuit of claim 29, wherein the instruction pointer logic circuit comprises:
- a circuit for determining a speculative instruction pointer for the first reorder buffer entry equal to a result data value from the first reorder buffer entry;
- a circuit for determining a speculative instruction pointer for the second reorder buffer entry equal to a result data value from the second reorder buffer entry.

32. The circuit of claim 31, wherein the instruction pointer logic circuit further comprises:
- a first comparator circuit determining whether the result data value for the first reorder buffer entry is greater than or equal to the instruction pointer limit;
- a second comparator circuit determining whether the result data value for the second reorder buffer entry is greater than or equal to the instruction pointer limit.

33. The circuit of claim 29, wherein the reorder buffer entries further comprise a third reorder buffer entry that occurs after the second reorder buffer entry in the sequential program order.

34. The circuit of claim 33, wherein the instruction pointer logic circuit further comprises:
- a third adder circuit for determining a speculative instruction pointer for the third reorder buffer entry by adding the instruction pointer, the instruction pointer delta value from the first reorder buffer entry, the instruction pointer delta value from the second reorder buffer entry, and an instruction pointer delta value from the third reorder buffer entry, the instruction pointer delta value from the third reorder buffer entry indicating a length of the instruction corresponding to the third reorder buffer entry.

35. The circuit of claim 34, wherein the instruction pointer logic circuit further comprises:
- a first comparator circuit determining whether the speculative instruction pointer for the first reorder buffer entry is greater than or equal to the instruction pointer limit plus one;
- a second comparator circuit determining whether the speculative instruction pointer for the second reorder buffer entry is greater than or equal to the instruction pointer limit plus one;
- a third first comparator circuit determining whether if the speculative instruction pointer for the third reorder buffer entry is greater than or equal to the instruction pointer limit plus one.

36. The circuit of claim 33, wherein the instruction pointer logic circuit comprises:
- a circuit for determining a speculative instruction pointer for the first reorder buffer entry equal to a result data value from the first reorder buffer entry;
- a circuit for determining a speculative instruction pointer for the second reorder buffer entry equal to a result data value from the second reorder buffer entry;
- a circuit for determining a speculative instruction pointer for the third reorder buffer entry equal to a result data value from the third reorder buffer entry.

37. The circuit of claim 36, wherein the instruction pointer logic circuit further comprises:
- a first comparator circuit determining whether the result data value for the first reorder buffer entry is greater than or equal to the instruction pointer limit;
- a second comparator circuit determining whether the result data value for the second reorder buffer entry is greater than or equal to the instruction pointer limit;
- a second comparator circuit determining whether the result data value for the third reorder buffer entry is greater than or equal to the instruction pointer limit.

38. The circuit of claim 33, wherein the reorder buffer entries further comprise a fourth reorder buffer entry that occurs after the third reorder buffer entry in the sequential program order.

39. The circuit of claim 38, wherein the instruction pointer logic circuit further comprises:
- a first adder circuit generating a speculative instruction pointer for the first reorder buffer entry by adding an instruction pointer to an instruction pointer delta value from the first reorder buffer entry, the instruction pointer delta value from the first reorder buffer entry indicates a length of the instruction corresponding to the first reorder buffer entry;
- a second adder circuit a speculative instruction pointer for the second reorder buffer entry by adding the instruction pointer, the instruction pointer delta value from the first reorder buffer entry, and an instruction pointer delta value from the second reorder buffer entry, the instruction pointer delta value from the second reorder buffer entry indicating a length of the instruction corresponding to the second reorder buffer entry;
- a third adder circuit a speculative instruction pointer for the third reorder buffer entry by adding the instruction pointer, the instruction pointer delta value from the first reorder buffer entry, the instruction pointer delta value from the third reorder buffer entry, and an instruction pointer delta value from the second reorder buffer entry, the instruction pointer delta value from the third reorder buffer entry indicating a length of the instruction corresponding to the second reorder buffer entry; and
- a fourth adder circuit a speculative instruction pointer for the fourth reorder buffer entry by adding the instruction pointer, the instruction pointer delta value from the first reorder buffer entry, the instruction pointer delta value from the second reorder buffer entry, the instruction pointer delta value from the third reorder buffer entry, and an instruction pointer delta value from the fourth reorder buffer entry, the instruction pointer delta value from the fourth reorder buffer entry indicating a length of the instruction corresponding to the fourth reorder buffer entry.

40. The circuit of claim 39, wherein the instruction pointer logic circuit further comprises:
- a first comparator circuit determining whether the speculative instruction pointer for the first reorder buffer entry is greater than or equal to the instruction pointer limit plus one;
- a second comparator circuit determining whether the speculative instruction pointer for the second reorder buffer entry is greater than or equal to the instruction pointer limit plus one;
- a third comparator circuit determining whether the speculative instruction pointer for the third reorder buffer entry is greater than or equal to the instruction pointer limit plus one;

a fourth comparator circuit determining whether the speculative instruction pointer for the fourth reorder buffer entry is greater than or equal to the instruction pointer limit plus one.

41. The circuit of claim 38, wherein the pointer logic circuit comprises:

a circuit for determining a speculative instruction pointer for the first reorder buffer entry equal to a result data value from the first reorder buffer entry;

a circuit for determining a speculative instruction pointer for the second reorder buffer entry equal to a result data value from the second reorder buffer entry;

a circuit for determining a speculative instruction pointer for the third reorder buffer entry equal to a result data value from the third reorder buffer entry;

a circuit for determining a speculative instruction pointer for the fourth reorder buffer entry equal to a result data value from the fourth reorder buffer entry.

42. The circuit of claim 41, wherein the instruction pointer logic circuit further comprises:

a first comparator circuit determining whether the result data value for the first reorder buffer entry is greater than or equal to the instruction pointer limit;

a second comparator circuit determining whether the result data value for the second reorder buffer entry is greater than or equal to the instruction pointer limit;

a third comparator circuit determining whether the result data value for the third reorder buffer entry is greater than or equal to the instruction pointer limit;

a fourth comparator circuit determining whether the result data value for the fourth reorder buffer entry is greater than or equal to the instruction pointer limit.

43. A computer system, comprising:

a memory subsystem storing a plurality of instructions according to a sequential program order, the memory subsystem coupled for communication over a host bus;

a processor fetching the instructions from the memory subsystem over the host bus and speculatively executing the instructions, the processor comprising a reorder buffer circuit storing a set of result data values for the instructions in a set of reorder buffer entries, wherein the reorder buffer entries comprise a first reorder buffer entry and a second reorder buffer entry such that the instruction corresponding to the second reorder buffer entry occurs after the instruction corresponding to the first reorder buffer entry in the sequential program order, the processor further comprising an instruction pointer logic circuit that determines a speculative instruction pointer for each reorder buffer entry and compares each speculative instruction pointer to an instruction pointer limit, the processor further comprising an event circuit that commits the result data value of each reorder buffer entry to the architectural state if the speculative instruction pointer for the result data value does not exceed the instruction pointer limit.

44. The computer system of claim 43, wherein the instruction pointer logic circuit comprises:

a first adder circuit generating a speculative instruction pointer for the first reorder buffer entry by adding an instruction pointer to an instruction pointer delta value from the first reorder buffer entry, the instruction pointer delta value from the first reorder buffer entry indicates a length of the instruction corresponding to the first reorder buffer entry;

a second adder circuit generating a speculative instruction pointer for the second reorder buffer entry by adding the instruction pointer, the instruction pointer delta value from the first reorder buffer entry, and an instruction pointer delta value from the second reorder buffer entry, the instruction pointer delta value from the second reorder buffer entry indicating a length of the instruction corresponding to the second reorder buffer entry.

45. The computer system of claim 44, wherein the instruction pointer logic circuit further comprises:

a first comparator circuit determining whether the speculative instruction pointer for the first reorder buffer entry is greater than or equal to the instruction pointer limit plus one; and a second comparator circuit determining whether the speculative instruction pointer for the second reorder buffer entry is greater than or equal to the instruction pointer limit plus one.

46. The computer system of claim 43, wherein the instruction pointer logic circuit comprises:

a circuit for determining a speculative instruction pointer for the first reorder buffer entry equal to a result data value from the first reorder buffer entry; and a circuit for determining a speculative instruction pointer for the second reorder buffer entry equal to a result data value from the second reorder buffer entry.

47. The computer system of claim 46, wherein the instruction pointer logic circuit further comprises:

a first comparator circuit determining whether the result data value for the first reorder buffer entry is greater than or equal to the instruction pointer limit;

a second comparator circuit determining whether the result data value for the second reorder buffer entry is greater than or equal to the instruction pointer limit.

48. A computer system, comprising:

a memory subsystem storing a plurality of instructions according to a sequential program order, the memory subsystem coupled for communication over a host bus;

a processor fetching the instructions from the memory subsystem over the host bus and speculatively executing the instructions, the processor comprising:

a circuit for reading the reorder buffer entries, wherein the reorder buffer entries comprise a first reorder buffer entry and a second reorder buffer entry such that the instruction corresponding to the second reorder buffer entry occurs after the instruction corresponding to the first reorder buffer entry in the sequential program order;

a circuit for determining the speculative instruction pointer for each reorder buffer entry, the speculative instruction pointer indicating an updated instruction pointer for the processor if the corresponding result data value is committed to an architectural state;

a circuit for determining whether each speculative instruction pointer exceeds the instruction pointer limit; and a circuit for committing the result data value of each reorder buffer entry to the architectural state if the speculative instruction pointer for the result data value does not exceed the instruction pointer limit.

49. The computer system of claim 48, wherein the circuit for determining a speculative instruction pointer each reorder buffer entry comprises:

a circuit for determining a speculative instruction pointer for the first reorder buffer entry by adding an instruction pointer to an instruction pointer delta value from the first reorder buffer entry, the instruction pointer delta value from the first reorder buffer entry indicates a length of the instruction corresponding to the first reorder buffer entry;

a circuit for determining a speculative instruction pointer for the second reorder buffer entry by adding the instruction pointer, the instruction pointer delta value from the first reorder buffer entry, and an instruction pointer delta value from the second reorder buffer entry, the instruction pointer delta value from the second reorder buffer entry indicating a length of the instruction corresponding to the second reorder buffer entry.

50. The computer system of claim 49, wherein the circuit for determining whether each speculative instruction pointer exceeds the instruction pointer limit comprises:

a circuit for determining that the speculative instruction pointer for the first reorder buffer entry exceeds the instruction pointer limit if the speculative instruction pointer for the first reorder buffer entry is greater than or equal to the instruction pointer limit plus one;

a circuit for determining that the speculative instruction pointer for the second reorder buffer entry exceeds the instruction pointer limit if the speculative instruction pointer for the second reorder buffer entry is greater than or equal to the instruction pointer limit plus one.

51. The computer system of claim 48, wherein the circuit for determining a speculative instruction pointer each reorder buffer entry comprises:

a circuit for determining a speculative instruction pointer for the first reorder buffer entry equal to a result data value from the first reorder buffer entry;

a circuit for determining a speculative instruction pointer for the second reorder buffer entry equal to a result data value from the second reorder buffer entry.

52. The computer system of claim 51, wherein the circuit for determining whether each speculative instruction pointer exceeds the instruction pointer limit comprises:

a circuit for determining that the speculative instruction pointer for the first reorder buffer entry exceeds the instruction pointer limit if the result data value for the first reorder buffer entry is greater than or equal to the instruction pointer limit;

a circuit for determining that the speculative instruction pointer for the second reorder buffer entry exceeds the instruction pointer limit if the result data value for the second reorder buffer entry is greater than or equal to the instruction pointer limit.

53. A method for executing multiple out of order branch instructions in a same clock cycle, comprising the steps of:

determining a speculative instruction pointer for each executed instruction by adding an instruction pointer to an instruction pointer delta value associated with each instruction executed that comprises a delta value for a particular a instruction plus delta values for instructions preceding the particular instruction;

comparing each speculative instruction pointer to an instruction pointer limit;

determining that a speculative instruction pointer exceeds the instruction pointer limit if the speculative instruction pointer is greater than or equal to the instruction pointer limit plus one;

if the speculative instruction pointer does not exceed the instruction pointer limit, committing a result data entry associated with the speculative instruction pointer to an architectural state;

if the speculative instruction pointer does exceed the instruction pointer limit, generating and storing fault information;

comparing each of the target addresses to the instruction pointer limit;

determining that a target address exceeds the instruction pointer limit if the target address is greater than or equal to the instruction pointer limit; and for a branch instruction whose speculative instruction pointer does not exceed the instruction pointer limit, calculating an updated instruction pointer value by summing an associated target address with an associated instruction pointer delta value and instruction pointer delta values of other instructions of the instructions executed whose speculative instruction pointers do not exceed the instruction pointer limit.

* * * * *